United States Patent
Tada et al.

(10) Patent No.: US 10,431,250 B2
(45) Date of Patent: *Oct. 1, 2019

(54) MAGNETIC TAPE HAVING CHARACTERIZED MAGNETIC LAYER

(71) Applicant: FUJIFILM Corporation, Tokyo (JP)

(72) Inventors: Toshio Tada, Minami-ashigara (JP); Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/900,230

(22) Filed: Feb. 20, 2018

(65) Prior Publication Data

US 2018/0240493 A1    Aug. 23, 2018

(30) Foreign Application Priority Data

Feb. 20, 2017  (JP) ................ 2017-029510

(51) Int. Cl.
*G11B 5/71* (2006.01)
*G11B 5/712* (2006.01)
(Continued)

(52) U.S. Cl.
CPC .......... *G11B 5/712* (2013.01); *G11B 5/00813* (2013.01); *G11B 5/70* (2013.01); *G11B 5/70615* (2013.01)

(58) Field of Classification Search
None
See application file for complete search history.

(56) References Cited

U.S. PATENT DOCUMENTS

| 3,966,686 A | 6/1976 | Asakura et al. |
| 4,112,187 A | 9/1978 | Asakura et al. |

(Continued)

FOREIGN PATENT DOCUMENTS

| DE | 101 46 429 A1 | 3/2002 |
| GB | 2495356 A | 4/2013 |

(Continued)

OTHER PUBLICATIONS

English Translation of JP 2002-367318 A. (Year: 2002).*

(Continued)

*Primary Examiner* — Kevin M Bernatz
(74) *Attorney, Agent, or Firm* — Sughrue Mion, PLLC

(57) ABSTRACT

A magnetic tape includes a non-magnetic support; and a magnetic layer including ferromagnetic powder and a binding agent on the non-magnetic support. The center line average surface roughness Ra measured regarding the surface of the magnetic layer is less than or equal to 1.8 nm. The logarithmic decrement acquired by a pendulum viscoelasticity test performed regarding the surface of the magnetic layer is less than or equal to 0.050, and ΔSFD in a longitudinal direction of the magnetic tape calculated by Expression 1: $\Delta SFD = SFD_{25°\,C.} - SFD_{-190°\,C.}$ is greater than or equal to 0.35. In Expression 1, the $SFD_{25°\,C.}$ is the switching field distribution SFD measured in a longitudinal direction of the magnetic tape at a temperature of 25° C., and the $SFD_{-190°\,C.}$ is the switching field distribution SFD measured in a longitudinal direction of the magnetic tape at a temperature of −190° C.

6 Claims, 3 Drawing Sheets

(51) Int. Cl.
*G11B 5/706* (2006.01)
*G11B 5/008* (2006.01)
*G11B 5/70* (2006.01)

(56) References Cited

U.S. PATENT DOCUMENTS

| | | | |
|---|---|---|---|
| 4,425,404 A | 1/1984 | Suzuki et al. | |
| 4,693,930 A | 9/1987 | Kuo et al. | |
| 4,746,569 A | 5/1988 | Takahashi et al. | |
| 4,825,317 A * | 4/1989 | Rausch | G11B 15/58 |
| | | | 360/128 |
| 5,242,752 A | 9/1993 | Isobe et al. | |
| 5,419,938 A | 5/1995 | Kagotani et al. | |
| 5,445,881 A | 9/1995 | Irie | |
| 5,474,814 A | 12/1995 | Komatsu et al. | |
| 5,496,607 A | 3/1996 | Inaba et al. | |
| 5,540,957 A | 7/1996 | Ueda et al. | |
| 5,585,032 A | 12/1996 | Nakata et al. | |
| 5,645,917 A | 7/1997 | Ejiri et al. | |
| 5,689,384 A | 11/1997 | Albrecht et al. | |
| 5,728,454 A | 3/1998 | Inaba et al. | |
| 5,786,074 A | 6/1998 | Soui | |
| 5,827,600 A | 10/1998 | Ejiri et al. | |
| 6,099,957 A | 8/2000 | Yamamoto et al. | |
| 6,183,606 B1 | 2/2001 | Kuo et al. | |
| 6,207,252 B1 | 3/2001 | Shimomura | |
| 6,228,461 B1 | 5/2001 | Sueki et al. | |
| 6,254,964 B1 | 7/2001 | Saito et al. | |
| 6,261,647 B1 | 7/2001 | Komatsu et al. | |
| 6,268,043 B1 | 7/2001 | Koizumi et al. | |
| 6,496,328 B1 | 12/2002 | Dugas | |
| 6,579,826 B2 | 6/2003 | Furuya et al. | |
| 6,649,256 B1 | 11/2003 | Buczek et al. | |
| 6,686,022 B2 | 2/2004 | Takano et al. | |
| 6,770,359 B2 * | 8/2004 | Masaki | G11B 5/70 |
| | | | 428/336 |
| 6,791,803 B2 | 9/2004 | Saito et al. | |
| 6,835,461 B1 | 12/2004 | Yamagata et al. | |
| 6,921,592 B2 | 7/2005 | Tani et al. | |
| 6,939,606 B2 | 9/2005 | Hashimoto et al. | |
| 6,950,269 B1 | 9/2005 | Johnson | |
| 6,994,925 B2 | 2/2006 | Masaki | |
| 7,014,927 B2 | 3/2006 | Sueki et al. | |
| 7,029,726 B1 | 4/2006 | Chen et al. | |
| 7,153,366 B1 | 12/2006 | Chen et al. | |
| 7,255,908 B2 | 8/2007 | Ishikawa et al. | |
| 7,511,907 B2 | 3/2009 | Dugas et al. | |
| 7,515,383 B2 | 4/2009 | Saito et al. | |
| 7,803,471 B1 | 9/2010 | Ota et al. | |
| 7,839,599 B2 | 11/2010 | Bui et al. | |
| 8,000,057 B2 | 8/2011 | Bui et al. | |
| 8,524,108 B2 | 9/2013 | Hattori | |
| 8,535,817 B2 * | 9/2013 | Imaoka | G11B 5/70 |
| | | | 428/844 |
| 8,576,510 B2 | 11/2013 | Cherubini et al. | |
| 8,681,451 B2 | 3/2014 | Harasawa et al. | |
| 9,105,294 B2 | 8/2015 | Jensen et al. | |
| 9,311,946 B2 | 4/2016 | Tanaka et al. | |
| 9,495,985 B2 | 10/2016 | Xia et al. | |
| 9,530,444 B2 | 12/2016 | Kasada | |
| 9,542,967 B2 | 1/2017 | Sekiguchi et al. | |
| 9,564,161 B1 | 2/2017 | Cherubini et al. | |
| 9,601,146 B2 * | 3/2017 | Kasada | G11B 5/78 |
| 9,704,425 B2 | 7/2017 | Zhang et al. | |
| 9,704,525 B2 | 7/2017 | Kasada | |
| 9,704,527 B2 | 7/2017 | Kasada | |
| 9,711,174 B2 | 7/2017 | Kasada et al. | |
| 9,721,605 B2 | 8/2017 | Oyanagi et al. | |
| 9,721,606 B2 | 8/2017 | Kasada | |
| 9,721,607 B2 | 8/2017 | Tada et al. | |
| 9,748,026 B2 | 8/2017 | Shirata | |
| 9,773,519 B2 * | 9/2017 | Kasada | G11B 5/5928 |
| 9,779,772 B1 | 10/2017 | Kasada et al. | |
| 9,837,104 B1 | 12/2017 | Biskeborn | |
| 9,837,116 B2 | 12/2017 | Ozawa et al. | |
| 9,959,894 B2 | 5/2018 | Omura | |
| 9,972,351 B1 * | 5/2018 | Kaneko | G11B 5/00826 |
| 9,978,414 B1 | 5/2018 | Kaneko et al. | |
| 9,984,710 B2 * | 5/2018 | Kasada | G11B 5/68 |
| 9,984,712 B1 | 5/2018 | Ozawa | |
| 9,984,716 B1 | 5/2018 | Kaneko et al. | |
| 10,008,230 B1 | 6/2018 | Ozawa et al. | |
| 10,026,430 B2 | 7/2018 | Kasada et al. | |
| 10,026,433 B2 * | 7/2018 | Kasada | G11B 5/78 |
| 10,026,434 B2 * | 7/2018 | Oyanagi | G11B 5/70 |
| 10,026,435 B2 | 7/2018 | Kasada et al. | |
| 10,062,403 B1 * | 8/2018 | Kasada | G11B 5/70 |
| 10,074,393 B2 | 9/2018 | Kaneko et al. | |
| 10,134,433 B2 * | 11/2018 | Kasada | G11B 5/70 |
| 10,170,144 B2 | 1/2019 | Ozawa et al. | |
| 2001/0038928 A1 | 11/2001 | Nakamigawa et al. | |
| 2001/0053458 A1 | 12/2001 | Suzuki et al. | |
| 2002/0072472 A1 | 7/2002 | Furuya et al. | |
| 2002/0122339 A1 | 9/2002 | Takano et al. | |
| 2003/0059649 A1 | 3/2003 | Saliba et al. | |
| 2003/0091866 A1 | 5/2003 | Ejiri et al. | |
| 2003/0124386 A1 | 7/2003 | Masaki | |
| 2003/0170498 A1 | 9/2003 | Inoue | |
| 2003/0228493 A1 | 12/2003 | Doushita et al. | |
| 2004/0018388 A1 | 1/2004 | Kitamura et al. | |
| 2004/0053074 A1 | 3/2004 | Jingu et al. | |
| 2004/0197605 A1 | 10/2004 | Seki et al. | |
| 2004/0213948 A1 | 10/2004 | Saito et al. | |
| 2004/0218304 A1 | 11/2004 | Goker et al. | |
| 2004/0265643 A1 | 12/2004 | Ejiri | |
| 2005/0057838 A1 | 3/2005 | Ohtsu | |
| 2005/0153170 A1 | 7/2005 | Inoue et al. | |
| 2005/0196645 A1 | 9/2005 | Doi et al. | |
| 2005/0260456 A1 | 11/2005 | Hanai et al. | |
| 2005/0260459 A1 | 11/2005 | Hanai et al. | |
| 2005/0264935 A1 | 12/2005 | Sueki et al. | |
| 2006/0008681 A1 | 1/2006 | Hashimoto et al. | |
| 2006/0035114 A1 | 2/2006 | Kuse et al. | |
| 2006/0056095 A1 | 3/2006 | Saitou | |
| 2006/0068232 A1 | 3/2006 | Mikamo et al. | |
| 2006/0187589 A1 | 8/2006 | Harasawa et al. | |
| 2006/0232883 A1 | 10/2006 | Biskeborn et al. | |
| 2007/0009769 A1 | 1/2007 | Kanazawa | |
| 2007/0020489 A1 | 1/2007 | Yamazaki et al. | |
| 2007/0020490 A1 | 1/2007 | Harasawa et al. | |
| 2007/0224456 A1 | 9/2007 | Murao et al. | |
| 2007/0230054 A1 | 10/2007 | Takeda et al. | |
| 2007/0231606 A1 | 10/2007 | Hanai | |
| 2008/0057351 A1 | 3/2008 | Meguro et al. | |
| 2008/0144211 A1 | 6/2008 | Weber et al. | |
| 2008/0152956 A1 | 6/2008 | Murayama et al. | |
| 2008/0174897 A1 | 7/2008 | Bates et al. | |
| 2008/0297950 A1 | 12/2008 | Noguchi et al. | |
| 2008/0311308 A1 | 12/2008 | Lee et al. | |
| 2009/0027812 A1 | 1/2009 | Noguchi et al. | |
| 2009/0087689 A1 | 4/2009 | Doushita et al. | |
| 2009/0161249 A1 | 6/2009 | Takayama et al. | |
| 2009/0162701 A1 | 6/2009 | Jensen et al. | |
| 2010/0000966 A1 | 1/2010 | Kamata et al. | |
| 2010/0035086 A1 | 2/2010 | Inoue et al. | |
| 2010/0035088 A1 | 2/2010 | Inoue | |
| 2010/0053810 A1 | 3/2010 | Biskeborn et al. | |
| 2010/0073816 A1 | 3/2010 | Komori et al. | |
| 2010/0081011 A1 | 4/2010 | Nakamura | |
| 2010/0134929 A1 | 6/2010 | Ito | |
| 2010/0227201 A1 | 9/2010 | Sasaki et al. | |
| 2010/0246073 A1 | 9/2010 | Katayama | |
| 2011/0003241 A1 | 1/2011 | Kaneko et al. | |
| 2011/0051280 A1 | 3/2011 | Karp et al. | |
| 2011/0052908 A1 | 3/2011 | Imaoka | |
| 2011/0077902 A1 | 3/2011 | Awezec et al. | |
| 2011/0151281 A1 | 6/2011 | Inoue | |
| 2011/0244272 A1 | 10/2011 | Suzuki et al. | |
| 2012/0045664 A1 | 2/2012 | Tanaka et al. | |
| 2012/0177951 A1 | 7/2012 | Yamazaki et al. | |
| 2012/0183811 A1 | 7/2012 | Hattori et al. | |
| 2012/0196156 A1 | 8/2012 | Suzuki | |
| 2012/0243120 A1 | 9/2012 | Harasawa et al. | |
| 2012/0244387 A1 | 9/2012 | Mori et al. | |

(56) References Cited

U.S. PATENT DOCUMENTS

| | | |
|---|---|---|
| 2012/0251845 A1 | 10/2012 | Wang et al. |
| 2013/0029183 A1 | 1/2013 | Omura et al. |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1 | 12/2014 | Kikuchi et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1* | 6/2017 | Kasada ............... G11B 5/78 |
| 2017/0186456 A1* | 6/2017 | Tada ............... G11B 5/708 |
| 2017/0186460 A1 | 6/2017 | Kasada et al. |
| 2017/0221513 A1 | 8/2017 | Hiroi et al. |
| 2017/0221516 A1 | 8/2017 | Oyanagi et al. |
| 2017/0221517 A1 | 8/2017 | Ozawa et al. |
| 2017/0249963 A1 | 8/2017 | Oyanagi et al. |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1* | 12/2017 | Kasada ............ G11B 5/00813 |
| 2017/0372736 A1 | 12/2017 | Kaneko et al. |
| 2017/0372737 A1* | 12/2017 | Oyanagi ............ G11B 5/00813 |
| 2017/0372738 A1 | 12/2017 | Kasada |
| 2017/0372739 A1 | 12/2017 | Ozawa et al. |
| 2017/0372740 A1 | 12/2017 | Ozawa et al. |
| 2017/0372741 A1 | 12/2017 | Kurokawa et al. |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1 | 3/2018 | Kasada |
| 2018/0082710 A1 | 3/2018 | Tada et al. |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1* | 6/2018 | Kasada ............... G11B 5/70 |
| 2018/0182426 A1 | 6/2018 | Ozawa et al. |
| 2018/0182427 A1 | 6/2018 | Kasada et al. |
| 2018/0182428 A1 | 6/2018 | Kasada et al. |
| 2018/0182429 A1 | 6/2018 | Kasada et al. |
| 2018/0182430 A1 | 6/2018 | Ozawa et al. |
| 2018/0240475 A1* | 8/2018 | Kasada ............... G11B 5/70 |
| 2018/0240476 A1* | 8/2018 | Kasada ............... G11B 5/70 |
| 2018/0240478 A1* | 8/2018 | Kasada ............... G11B 5/70 |
| 2018/0240479 A1* | 8/2018 | Kasada ............ G11B 5/3909 |
| 2018/0240481 A1* | 8/2018 | Kasada ............... G11B 5/584 |
| 2018/0240488 A1 | 8/2018 | Kasada |
| 2018/0240489 A1* | 8/2018 | Kasada ............... G11B 5/70 |
| 2018/0240490 A1* | 8/2018 | Kurokawa ............... G11B 5/70 |
| 2018/0240491 A1* | 8/2018 | Ozawa ............ G11B 5/00813 |
| 2018/0240492 A1 | 8/2018 | Kasada |
| 2018/0240494 A1 | 8/2018 | Kurokawa et al. |
| 2018/0240495 A1* | 8/2018 | Kasada ............... G11B 5/712 |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286446 A1 | 10/2018 | Ozawa et al. |
| 2018/0286447 A1 | 10/2018 | Ozawa et al. |
| 2018/0286448 A1* | 10/2018 | Ozawa ............... G11B 5/714 |
| 2018/0286449 A1 | 10/2018 | Kasada et al. |
| 2018/0286450 A1 | 10/2018 | Kasada et al. |
| 2018/0286451 A1* | 10/2018 | Ozawa ............... G11B 5/70 |
| 2018/0286452 A1 | 10/2018 | Ozawa et al. |
| 2018/0286453 A1 | 10/2018 | Kasada et al. |
| 2018/0301165 A1* | 10/2018 | Oyanagi ............... G11B 5/70 |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2018/0374507 A1 | 12/2018 | Kasada |
| 2019/0027167 A1 | 1/2019 | Tada et al. |
| 2019/0027168 A1* | 1/2019 | Kasada ............ G11B 5/00813 |
| 2019/0027171 A1 | 1/2019 | Kasada |
| 2019/0027172 A1 | 1/2019 | Kasada |
| 2019/0027174 A1 | 1/2019 | Tada et al. |
| 2019/0027175 A1 | 1/2019 | Kurokawa et al. |
| 2019/0027176 A1 | 1/2019 | Kurokawa et al. |
| 2019/0027177 A1 | 1/2019 | Kasada |
| 2019/0027178 A1 | 1/2019 | Kasada |
| 2019/0027179 A1 | 1/2019 | Ozawa et al. |
| 2019/0027180 A1 | 1/2019 | Kasada et al. |
| 2019/0027181 A1 | 1/2019 | Ozawa et al. |
| 2019/0035424 A1 | 1/2019 | Endo |
| 2019/0051325 A1* | 2/2019 | Kasada ............... G11B 5/70 |
| 2019/0088278 A1 | 3/2019 | Kasada et al. |
| 2019/0096437 A1* | 3/2019 | Ozawa ............... G11B 5/70 |
| 2019/0103130 A1* | 4/2019 | Kasada ............ G11B 5/00813 |
| 2019/0103131 A1* | 4/2019 | Kasada ............ G11B 5/00813 |
| 2019/0103133 A1 | 4/2019 | Ozawa et al. |
| 2019/0103134 A1 | 4/2019 | Kasada et al. |
| 2019/0103135 A1 | 4/2019 | Ozawa et al. |
| 2019/0130936 A1 | 5/2019 | Kaneko et al. |

FOREIGN PATENT DOCUMENTS

| | | | |
|---|---|---|---|
| JP | 6111924 A | | 1/1986 |
| JP | 61-139923 A | | 6/1986 |
| JP | 61-139932 A | | 6/1986 |
| JP | 63-129519 A | | 6/1988 |
| JP | 63-249932 A | | 10/1988 |
| JP | 64-57422 A | | 3/1989 |
| JP | 64-60819 A | | 3/1989 |
| JP | 5-258283 A | | 10/1993 |
| JP | 5-298653 A | | 11/1993 |
| JP | 7-57242 A | | 3/1995 |
| JP | 11-110743 A | | 4/1999 |
| JP | 11-175949 A | | 7/1999 |
| JP | 11-273051 A | | 10/1999 |
| JP | 2000-251240 A | | 9/2000 |
| JP | 2002-157726 A | | 5/2002 |
| JP | 2002-329605 A | | 11/2002 |
| JP | 2002-367142 A | | 12/2002 |
| JP | 2002367318 A | * | 12/2002 |
| JP | 2003-77116 A | | 3/2003 |
| JP | 2003-323710 A | | 11/2003 |
| JP | 2004-005820 A | | 1/2004 |

(56) References Cited

FOREIGN PATENT DOCUMENTS

| | | |
|---|---|---|
| JP | 2004-133997 A | 4/2004 |
| JP | 2004-185676 A | 7/2004 |
| JP | 2005-38579 A | 2/2005 |
| JP | 2005-243063 A | 9/2005 |
| JP | 2005-243162 A | 9/2005 |
| JP | 2006-92672 A | 4/2006 |
| JP | 2006-286114 A | 10/2006 |
| JP | 2007-273039 A | 10/2007 |
| JP | 2007-287310 A | 11/2007 |
| JP | 2007-297427 A | 11/2007 |
| JP | 2008-243317 A | 10/2008 |
| JP | 2009-283082 A | 12/2009 |
| JP | 2010-036350 A | 2/2010 |
| JP | 2010-049731 A | 3/2010 |
| JP | 2011-48878 A | 3/2011 |
| JP | 2011-138566 A | 7/2011 |
| JP | 2011-210288 A | 10/2011 |
| JP | 2011-225417 A | 11/2011 |
| JP | 2012-38367 A | 2/2012 |
| JP | 2012-043495 A | 3/2012 |
| JP | 2012-203955 A | 10/2012 |
| JP | 2013-25853 A | 2/2013 |
| JP | 2013-77360 A | 4/2013 |
| JP | 2013-164889 A | 8/2013 |
| JP | 2014-15453 A | 1/2014 |
| JP | 2014-179149 A | 9/2014 |
| JP | 2015-39801 A | 3/2015 |
| JP | 2015-111484 A | 6/2015 |
| JP | 2016-15183 A | 1/2016 |
| JP | 2016-502224 A | 1/2016 |
| JP | 2016-051493 A | 4/2016 |
| JP | 2016-71926 A | 5/2016 |
| JP | 2016-139451 A | 8/2016 |

OTHER PUBLICATIONS

Office Action dated Apr. 26, 2017 which issued during the prosecution of U.S. Appl. No. 15/388,864.
Office Action dated Aug. 10, 2017, which issued during the prosecution of U.S. Appl. No. 14/870,618.
Office Action dated Aug. 3, 2018 which issued during the prosecution of U.S. Appl. No. 15/388,911.
Office Action dated Feb. 4, 2016 which issued during the prosecution of U.S. Appl. No. 14/753,227.
Office Action dated Jun. 7, 2018 which issued during the prosecution of U.S. Appl. No. 15/380,309.
Office Action dated May 2, 2018, which issued during the prosecution of U.S. Appl. No. 15/280,195.
Office Action dated May 4, 2018, which issued during the prosecution of U.S. Appl. No. 15/422,944.
Office Action dated May 4, 2018, which issued during the prosecution of U.S. Appl. No. 15/625,428.
Office Action dated May 7, 2018, which issued during the prosecution of U.S. Appl. No. 15/624,792.
Office Action dated May 7, 2018, which issued during the prosecution of U.S. Appl. No. 15/624,897.
Office Action dated May 7, 2018, which issued during the prosecution of U.S. Appl. No. 15/626,832.
Office Action dated Nov. 16, 2016 which issued during the prosecution of U.S. Appl. No. 15/072,550.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Oct. 15, 2018, which issued during the prosecution of U.S. Appl. No. 15/619,012.
Office Action dated Oct. 22, 2018, which issued during the prosecution of U.S. Appl. No. 15/854,439.
Office Action dated Oct. 9, 2018, which issued during the prosecution of U.S. Appl. No. 15/628,814.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Sep. 27, 2018, which issued during the prosecution of U.S. Appl. No. 15/854,383.
Office Action dated Aug. 23, 2018 from the United States Patent and Trademark Office in U.S. Appl. No. 15/614,876.
Office Action dated Aug. 23, 2018 from the United States Patent and Trademark Office in U.S. Appl. No. 15/621,464.
Office Action dated Aug. 23, 2018 from the United States Patent and Trademark Office in U.S. Appl. No. 15/626,720.
Office Action dated Aug. 24, 2018 from the United States Patent and Trademark Office in U.S. Appl. No. 15/620,916.
Office Action dated Aug. 3, 2018 from the United States Patent and Trademark Office in U.S. Appl. No. 15/380,336.
Office Action dated Dec. 5, 2016 from the United States Patent and Trademark Office in U.S. Appl. No. 14/978,834.
Office Action dated Dec. 6, 2016 from the United States Patent and Trademark Office in U.S. Appl. No. 14/757,555.
Office Action dated Jun. 9, 2017 which issued during the prosecution of U.S. Appl. No. 15/388,864.
Office Action dated May 30, 2018 which issued during the prosecution of U.S. Appl. No. 15/388,911.
Office Action dated Nov. 18, 2016 which issued during the prosecution of U.S. Appl. No. 14/753,227.
Office Action dated Aug. 15, 2016 which issued during the prosecution of U.S. Appl. No. 14/753,227.
"Introduction to TMR Magnetic Sensors", Anonymous, Mar. 12, 2015, MR Sensor Technology, pp. 1-5 (Year: 2015).
Notice of Allowance dated Apr. 25, 2017 which issued during the prosecution of U.S. Appl. No. 15/072,550.
Notice of Allowance dated Apr. 27, 2017, which issued during the prosecution of U.S. Appl. No. 15/052,115.
Notice of Allowance dated Apr. 5, 2018, which issued during the prosecution of U.S. Appl. No. 14/867,752.
Notice of Allowance dated Aug. 28, 2018 from the US Patent & Trademark Office in U.S. Appl. No. 15/422,821.
Notice of Allowance dated Aug. 30, 2017, which issued during the prosecution of U.S. Appl. No. 15/466,143.
Notice of Allowance dated Aug. 6, 2018, which issued during the prosecution of U.S. Appl. No. 15/920,768.
Notice of Allowance dated Aug. 9, 2018, which issued during the prosecution of U.S. Appl. No. 15/920,563.
Notice of Allowance dated Dec. 2, 2016 which issued during the prosecution of U.S. Appl. No. 14/753,227.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Notice of Allowance dated Feb. 14, 2018, which issued during the prosecution of U.S. Appl. No. 14/870,618.
Notice of Allowance dated Jul. 12, 2017 which issued during the prosecution of U.S. Appl. No. 15/388,864.
Notice of Allowance dated Jul. 13, 2018, which issued during the prosecution of U.S. Appl. No. 15/920,782.
Notice of Allowance dated Jun. 2, 2017, which issued during the prosecution of U.S. Appl. No. 15/218,190.
Notice of Allowance dated Jun. 28, 2017, which issued during the prosecution of U.S. Appl. No. 15/464,991.
Notice of Allowance dated Mar. 14, 2018, which issued during the prosecution of U.S. Appl. No. 15/854,474.
Notice of Allowance dated Mar. 16, 2018 which issued during the prosecution of U.S. Appl. No. 15/854,410.
Notice of Allowance dated Mar. 19, 2018, which issued during the prosecution of U.S. Appl. No. 15/378,907.
Notice of Allowance dated Mar. 21, 2018, which issued during the prosecution of U.S. Appl. No. 15/241,286.
Notice of Allowance dated Mar. 21, 2018, which issued during the prosecution of U.S. Appl. No. 15/241,297.
Notice of Allowance dated Mar. 27, 2018, which issued during the prosecution of U.S. Appl. No. 15/241,631.

(56) References Cited

OTHER PUBLICATIONS

Notice of Allowance dated May 10, 2018 which issued during the prosecution of U.S. Appl. No. 15/615,871.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Oct. 11, 2018, which issued during the prosecution of U.S. Appl. No. 15/380,336.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,792.
Notice of Allowance dated Oct. 11, 2018, which issued during the prosecution of U.S. Appl. No. 15/624,897.
Notice of Allowance dated Oct. 12, 2018, which issued during the prosecution of U.S. Appl. No. 15/626,832.
Notice of Allowance dated Oct. 6, 2016, which issued during the prosecution of U.S. Appl. No. 14/209,065.
Notice of Allowance dated Sep. 24, 2018, which issued during the prosecution of U.S. Appl. No. 15/854,438.
Notice of Allowance dated Sep. 4, 2018, which issued during the prosecution of U.S. Appl. No. 15/625,428.
Notice of Allowance dated Aug. 27, 2018 in U.S. Appl. No. 15/920,635.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Notice of Allowance dated Mar. 5, 2019 in U.S. Appl. No. 16/009,603.
Office Action dated Apr. 19, 2018, which issued during the prosecution of U.S. Appl. No. 15/854,438.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Feb. 25, 2016, which issued during the prosecution of U.S. Appl. No. 14/867,752.
Office Action dated Jan. 27, 2015 from the Japanese Patent Office in Japanese Application No. 2013-053543.
Office Action dated Jan. 31, 2018, which issued during the prosecution of U.S. Appl. No. 14/867,752.
Office Action dated Jul. 3, 2018, which issued during the prosecution of U.S. Appl. No. 15/920,518.
Office Action dated Feb. 28, 2019, which issued during the prosecution of U.S. Appl. No. 15/920,518.
Office Action dated Jul. 6, 2015, which issued during the prosecution of U.S. Appl. No. 14/209,065.
Office Action dated Jul. 6, 2018 from the United States Patent and Trademark Office in U.S. Appl. No. 15/848,173.
Office Action dated Mar. 13, 2015, which issued during the prosecution of U.S. Appl. No. 14/209,065.
Office Action dated Mar. 16, 2017, which issued during the prosecution of U.S. Appl. No. 14/867,752.
Office Action dated Mar. 24, 2016, which issued during the prosecution of U.S. Appl. No. 14/209,065.
Office Action dated May 4, 2018 which issued during the prosecution of U.S. Appl. No. 15/422,821.
Office Action dated Nov. 28, 2018, which issued during the prosecution of U.S. Appl. No. 15/899,587.
Office Action dated Nov. 28, 2018, which issued during the prosecution of U.S. Appl. No. 15/900,080.
Office Action dated Nov. 28, 2018, which issued during the prosecution of U.S. Appl. No. 15/900,144.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Office Action dated Nov. 8, 2016 from the Japanese Patent Office in Japanese Application No. 2014-199022.
Office Action dated Oct. 15, 2018, which issued during the prosecution of U.S. Appl. No. 15/854,403.
Office Action dated Oct. 19, 2016, which issued during the prosecution of U.S. Appl. No. 14/867,752.
Office Action dated Oct. 3, 2018 from the United States Patent and Trademark Office in U.S. Appl. No. 15/280,195.
Office Action dated Oct. 5, 2017, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Office Action dated Sep. 10, 2015, which issued during the prosecution of U.S. Appl. No. 14/209,065.
Office Action dated Sep. 19, 2014, which issued during the prosecution of U.S. Appl. No. 14/209,065.
Office Action dated Sep. 26, 2017 issued by the Japanese Patent Office in JP Appln. No. 2014-265723.
Office Action dated Sep. 26, 2017 issued by the Japanese Patent Office in JP Appln. No. 2015-249264.
Office Action dated Sep. 28, 2018, which issued during the prosecution of U.S. Appl. No. 15/854,409.
Office Action dated Sep. 7, 2017, which issued during the prosecution of U.S. Appl. No. 14/867,752.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,106.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 27, 2018 in U.S. Appl. No. 15/900,334.
Office Action dated Dec. 31, 2018 in U.S. Appl. No. 16/009,603.
Office Action dated Dec. 7, 2018 in U.S. Appl. No. 15/920,592.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 7, 2019 in U.S. Appl. No. 15/621,464.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Mar. 5, 2019 in U.S. Appl. No. 15/443,026.
Office Action dated Mar. 6, 2019 in U.S. Appl. No. 15/854,403.
Office Action dated Nov. 14, 2018 in U.S. Appl. No. 16/100,289.
Office Action dated Nov. 19, 2018 in U.S. Appl. No. 15/900,141.
Notice of Allowance dated Apr. 16, 2019 in U.S. Appl. No. 15/625,428.

(56) References Cited

OTHER PUBLICATIONS

Notice of Allowance dated Apr. 30, 2019 in U.S. Appl. No. 15/380,309.
Notice of Allowance dated Mar. 13, 2019 in U.S. Appl. No. 16/100,289.
Notice of Allowance dated Mar. 18, 2019 in U.S. Appl. No. 15/626,355.
Notice of Allowance dated Mar. 18, 2019 in U.S. Appl. No. 15/628,814.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Feb. 5, 2019 in U.S. Appl. No. 16/038,339.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 7, 2019 in U.S. Appl. No. 15/854,439.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Office Action dated Apr. 4, 2019 in U.S. Appl. No. 16/184,312.
U.S. Appl. No. 15/052,115, Patented as No. 9,704,527.
U.S. Appl. No. 15/218,190, Patented as No. 9,721,606.
U.S. Appl. No. 15/280,195, Pending.
U.S. Appl. No. 15/422,821, Allowed.
U.S. Appl. No. 15/422,944, Allowed.
U.S. Appl. No. 15/466,143, Patented as No. 9,837,116.
U.S. Appl. No. 15/619,012, Pending.
U.S. Appl. No. 15/624,897, Pending.
U.S. Appl. No. 15/624,792, Pending.
U.S. Appl. No. 15/626,832, Pending.
U.S. Appl. No. 15/625,428, Allowed.
U.S. Appl. No. 14/978,834, Patented as No. 9,721,605.
U.S. Appl. No. 14/757,555, Patented as No. 9,711,174.
U.S. Appl. No. 15/197,046, Patented as No. 9,721,607.
U.S. Appl. No. 15/380,336, Pending.
U.S. Appl. No. 15/614,876, Allowed.
U.S. Appl. No. 15/620,916, Pending.
U.S. Appl. No. 15/621,464, Allowed.
U.S. Appl. No. 15/626,720, Allowed.
U.S. Appl. No. 15/854,383, Pending.
U.S. Appl. No. 15/854,507, Patented as No. 9,984,716.
U.S. Appl. No. 15/854,439, Pending.
U.S. Appl. No. 15/854,506, Patented as No. 10,008,230.
U.S. Appl. No. 15/848,173, Allowed.
U.S. Appl. No. 15/628,814, Allowed.
U.S. Appl. No. 15/690,400, Pending.
U.S. Appl. No. 15/690,906, Pending.
U.S. Appl. No. 15/626,355, Allowed.
U.S. Appl. No. 15/627,696, Pending.
U.S. Appl. No. 14/870,618, Patented as No. 9,959,894.
U.S. Appl. No. 15/388,911, Pending.
U.S. Appl. No. 14/753,227, Patented as No. 9,601,146.
U.S. Appl. No. 15/380,309, Allowed.
U.S. Appl. No. 15/388,864, Patented as No. 9,773,519.
U.S. Appl. No. 15/072,550, Patented as No. 9,704,525.
U.S. Appl. No. 15/615,871, Patented as No. 10,074,393.
U.S. Appl. No. 15/854,410, Patented as No. 9,972,351.
U.S. Appl. No. 15/378,907, Patented as No. 9,984,710.
U.S. Appl. No. 15/241,631, Patented as No. 10,026,435.
U.S. Appl. No. 14/209,065, Patented as No. 9,530,444.
U.S. Appl. No. 15/854,474, Patented as No. 9,978,414.
U.S. Appl. No. 15/854,403, Pending.
U.S. Appl. No. 15/241,297, Patented as No. 10,026,434.
U.S. Appl. No. 15/241,286, Patented as No. 10,026,433[1].
U.S. Appl. No. 15/464,991, Patented as No. 9,779,772.
U.S. Appl. No. 14/867,752, Patented as No. 10,026,430.
U.S. Appl. No. 15/854,438, Allowed.
U.S. Appl. No. 15/854,409, Allowed.
U.S. Appl. No. 15/443,026, Pending.
U.S. Appl. No. 15/920,782, Patented as No. 10,134,433.
U.S. Appl. No. 15/920,563, Allowed.
U.S. Appl. No. 15/920,533, Pending.
U.S. Appl. No. 15/900,144, Pending.
U.S. Appl. No. 15/900,080, Pending.
U.S. Appl. No. 15/900,230 (the present Application), Pending.
U.S. Appl. No. 15/900,164, Allowed.
U.S. Appl. No. 15/920,518, Pending.
U.S. Appl. No. 15/899,587, Pending.
U.S. Appl. No. 15/899,430, Allowed.
U.S. Appl. No. 15/920,515, Allowed.
U.S. Appl. No. 15/920,517, Allowed.
U.S. Appl. No. 15/920,538, Allowed.
U.S. Appl. No. 15/920,544, Allowed.
U.S. Appl. No. 15/920,768, Allowed.
U.S. Appl. No. 16/009,603, Allowed.
U.S. Appl. No. 16/182,083, Pending (Continuation of U.S. Appl. No. 15/920,768).
U.S. Appl. No. 15/705,531, Pending.
U.S. Appl. No. 16/232,165, Pending (Continuation of U.S. Appl. No. 15/854,438).
U.S. Appl. No. 16/100,289, Allowed.
U.S. Appl. No. 16/038,669, Pending.
U.S. Appl. No. 15/900,106, Allowed.
U.S. Appl. No. 15/900,412, Patented as No. 10,062,403[2].
U.S. Appl. No. 15/900,141, Pending.
U.S. Appl. No. 15/900,160, Pending.
U.S. Appl. No. 15/900,345, Pending.
U.S. Appl. No. 15/900,379, Allowed.
U.S. Appl. No. 16/012,018, Pending.
U.S. Appl. No. 15/920,616, Pending.
U.S. Appl. No. 15/900,242, Allowed.
U.S. Appl. No. 15/900,334, Pending.
U.S. Appl. No. 15/920,592, Pending.
U.S. Appl. No. 15/920,635, Patented as No. 10,170,144.
U.S. Appl. No. 16/160,377, Pending.
U.S. Appl. No. 15/443,094, Pending.
U.S. Appl. No. 15/442,961, Pending.
U.S. Appl. No. 16/038,687, Pending.
U.S. Appl. No. 16/038,514, Pending.
U.S. Appl. No. 16/038,545, Pending.

(56) References Cited

OTHER PUBLICATIONS

U.S. Appl. No. 16/037,596, Pending.
U.S. Appl. No. 16/038,771, Pending.
U.S. Appl. No. 16/037,564, Pending.
U.S. Appl. No. 16/184,312, Pending.
U.S. Appl. No. 16/143,646, Pending.
Notice of Allowance dated Jul. 16, 2019 in U.S. Appl. No. 15/900,144.
Notice of Allowance dated Jun. 25, 2019 in U.S. Appl. No. 15/620,916.
Notice of Allowance dated Jun. 27, 2019 in U.S. Appl. No. 15/854,439.
Notice of Allowance dated Jun. 6, 2019 in U.S. Appl. No. 15/854,383.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Office Action dated Jun. 25, 2019 in Japanese Application No. 2015-245144 Translation; Machine corresponds to U.S. Appl. No. 15/378,907.
Office Action dated Jun. 6, 2019 in U.S. Appl. No. 15/899,587.
Office Action dated May 23, 2019 in U.S. Appl. No. 15/388,911.
Office Action dated Jun. 10, 2019 in US Appl. No. 15/920,518.
Office Action dated Jul. 16, 2019 in Japanese Application No. 2016-124933 Translation, Machine corresponds to U.S. Appl. No. 15/627,696.
Office Action dated Aug. 6, 2019 in Japanese Application No. 2016-254421 Translation; Machine corresponds to U.S. Appl. No. 15/854,383.
Office Action dated Aug. 6, 2019 in Japanese Application No. 2016-254427 Translation; Machine corresponds to U.S. Appl. No. 15/848,173.
Notice of Allowance dated Jul. 31, 2019 in U.S. Appl. No. 16/100,289.
Notice of Allowance dated Jul. 31, 2019 in U.S. Appl. No. 16/143,646.
U.S. Appl. No. 16/038,339, Allowed.
U.S. Appl. No. 16/037,573, Pending.
U.S. Appl. No. 16/037,681, Pending.
U.S. Appl. No. 16/038,884, Pending.
U.S. Appl. No. 16/038,847, Pending.
U.S. Appl. No. 16/044,574, Allowed.
U.S. Appl. No. 16/142,560, Pending.
U.S. Appl. No. 16/184,312, Allowed.
U.S. Appl. No. 16/143,646, Allowed.
U.S. Appl. No. 16/144,428, Pending.
U.S. Appl. No. 16/143,747, Pending.
U.S. Appl. No. 16/440,161, Pending.
U.S. Appl. No. 16/144,605, Pending.

* cited by examiner

MAGNETIC TAPE HAVING CHARACTERIZED MAGNETIC LAYER

CROSS-REFERENCE TO RELATED APPLICATIONS

This application claims priority under 35 U.S.C 119 to Japanese Patent Application No. 2017-029510 filed on Feb. 20, 2017. The above application is hereby expressly incorporated by reference, in its entirety, into the present application.

BACKGROUND OF THE INVENTION

1. Field of the Invention

The present invention relates to a magnetic tape.

2. Description of the Related Art

Magnetic recording media are divided into tape-shaped magnetic recording media and disk-shaped magnetic recording media, and tape-shaped magnetic recording media, that is, magnetic tapes are mainly used for storage such as data back-up. The recording and reproducing of information to the magnetic tape are normally performed by allowing the magnetic tape to run in a drive and bringing the surface of the magnetic layer of the magnetic tape to come into contact with a magnetic head (hereinafter, also simply referred to as a "head") to slide thereon.

In the field of magnetic recording, the improvement of electromagnetic conversion characteristics is constantly required. In regards to this point, JP2010-49731A, for example, discloses that a magnetic recording medium having excellent electromagnetic conversion characteristics is obtained by increasing surface smoothness of a magnetic layer (for example, see paragraphs 0020 and 0178 of JP2010-49731A).

SUMMARY OF THE INVENTION

Increasing surface smoothness of a surface of a magnetic layer of a magnetic tape is an effective method for narrowing an interval (spacing) between a surface of a magnetic layer of a magnetic tape and a head to improve electromagnetic conversion characteristics.

However, in such studies of the inventors, it was clear that a decrease in reproduction output is observed while repeating the running in the magnetic tape in which surface smoothness of the magnetic layer is increased.

Therefore, an object of the invention is to provide a magnetic tape which includes a magnetic layer having high surface smoothness and in which a decrease in reproduction output during repeated running is prevented.

According to one aspect of the invention, there is provided a magnetic tape comprising: a non-magnetic support; and a magnetic layer including ferromagnetic powder and a binding agent on the non-magnetic support, in which a center line average surface roughness Ra measured regarding a surface of the magnetic layer is equal to or smaller than 1.8 nm, a logarithmic decrement acquired by a pendulum viscoelasticity test performed regarding the surface of the magnetic layer is equal to or smaller than 0.050, and ΔSFD in a longitudinal direction of the magnetic tape calculated by Expression 1, $\Delta SFD = SFD_{25°\,C.} - SFD_{-190°\,C.}$ ... Expression 1, is equal to or greater than 0.35. In Expression 1, the $SFD_{25°\,C.}$ is a switching field distribution (SFD) measured in a longitudinal direction of the magnetic tape at a temperature of 25° C., and the $SFD_{-190°\,C.}$ is a switching field distribution SFD measured in a longitudinal direction of the magnetic tape at a temperature of −190° C. In the invention and the specification, magnetic properties described without a measurement temperature indicate a value measured at a temperature of 25° C., unless otherwise noted.

In one aspect, the logarithmic decrement is 0.010 to 0.050.

In one aspect, the center line average surface roughness Ra is 1.2 nm to 1.8 nm.

In one aspect, the ΔSFD is 0.35 to 1.50.

In one aspect, the magnetic tape further comprises a non-magnetic layer including non-magnetic powder and a binding agent between the non-magnetic support and the magnetic layer.

In one aspect, the magnetic tape further comprises a back coating layer including non-magnetic powder and a binding agent on a surface side of the non-magnetic support opposite to a surface side provided with the magnetic layer.

In the magnetic tape according to one aspect of the invention, it is possible to increase surface smoothness of the magnetic layer and prevent a decrease in reproduction output during repeated running.

DESCRIPTION OF THE PREFERRED EMBODIMENTS

Figure 1:
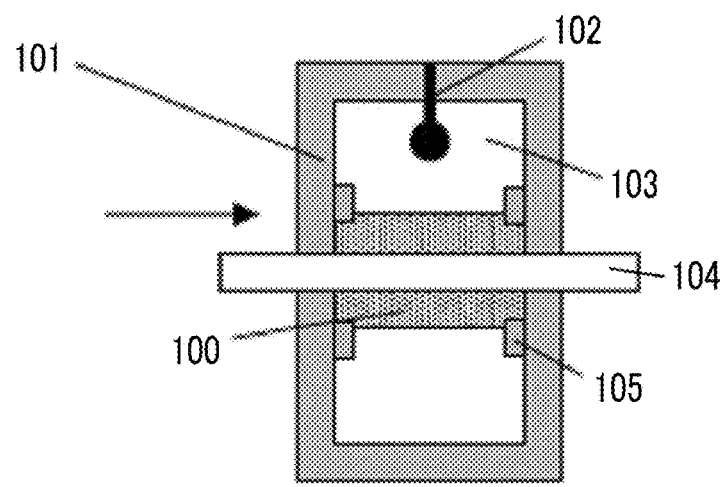
FIG. 1 is an explanatory diagram of a measurement method of a logarithmic decrement.

In an aspect of the invention, there is provided a magnetic tape including: a non-magnetic support; and a magnetic layer including ferromagnetic powder and a binding agent on the non-magnetic support, in which a center line average surface roughness Ra measured regarding a surface of the magnetic layer (hereinafter, also simply referred to as a "magnetic layer surface roughness Ra") is equal to or smaller than 1.8 nm, a logarithmic decrement acquired by a pendulum viscoelasticity test performed regarding the surface of the magnetic layer (hereinafter, also simply referred to as a "logarithmic decrement") is equal to or smaller than 0.050, and ΔSFD in a longitudinal direction of the magnetic tape calculated by Expression 1 (hereinafter, simply referred to as "ΔSFD") is equal to or greater than 0.35.

Hereinafter, the magnetic tape will be described more specifically.

Magnetic Layer Surface Roughness Ra

The center line average surface roughness Ra measured regarding the surface of the magnetic layer of the magnetic tape is equal to or smaller than 1.8 nm. Accordingly, the magnetic tape can exhibit excellent electromagnetic conversion characteristics. From a viewpoint of further improving the electromagnetic conversion characteristics, the magnetic layer surface roughness Ra is preferably equal to or smaller than 1.7 nm, even more preferably equal to or smaller than 1.6 nm, and still more preferably equal to or smaller than 1.5 nm. In addition, the magnetic layer surface roughness Ra can be equal to or greater than 1.0 nm or equal to or greater than 1.2 nm. However, from a viewpoint of improving the electromagnetic conversion characteristics, low magnetic layer surface roughness Ra is preferable, and thus, the magnetic layer surface roughness Ra may be lower than the exemplified lower limit.

In the invention and the specification, the center line average surface roughness Ra measured regarding the surface of the magnetic layer of the magnetic tape is a value measured with an atomic force microscope (AFM) in a region, of the surface of the magnetic layer, having an area of 40 µm×40 µm. As an example of the measurement conditions, the following measurement conditions can be used. The magnetic layer surface roughness Ra shown in examples which will be described later is a value obtained by the measurement under the following measurement conditions. In the invention and the specification, the "surface of the magnetic layer" of the magnetic tape is identical to the surface of the magnetic tape on the magnetic layer side.

The measurement is performed regarding the region of 40 µm×40 µm of the area of the surface of the magnetic layer of the magnetic tape with an AFM (Nanoscope 4 manufactured by Veeco Instruments, Inc.) in a tapping mode. RTESP-300 manufactured by BRUKER is used as a probe, a scan speed (probe movement speed) is set as 40 µm/sec, and a resolution is set as 512 pixel×512 pixel.

The magnetic layer surface roughness Ra can be controlled by a well-known method. For example, the magnetic layer surface roughness Ra can be changed in accordance with the size of various powders included in the magnetic layer or manufacturing conditions of the magnetic tape. Thus, by adjusting one or more of these, it is possible to obtain a magnetic tape having the magnetic layer surface roughness Ra equal to or smaller than 1.8 nm.

The inventors have found that, in the magnetic tape having the magnetic layer surface roughness Ra equal to or smaller than 1.8 nm, in a case where any measures are not prepared, the reproduction output is decreased while repeating running. Although the reason of a decrease in reproduction output is not clear, it is found that the decrease in reproduction output significantly occurs in a case of repeated running of the magnetic tape at a high speed in an environment of a high temperature and low humidity. The environment of a high temperature and low humidity here is, for example, an environment in which an atmosphere temperature is 30° C. to 45° C. and relative humidity is 5% to 20%. The running at a high speed is, for example, running of the magnetic tape at a running speed equal to or higher than 6.0 m/sec.

Therefore, as a result of intensive studies of the inventors, the inventors have newly found that it is possible to prevent a decrease in reproduction output during repeated running in the environment of a high temperature and low humidity, by respectively setting the logarithmic decrement and the ΔSFD as described above, in the magnetic tape having the magnetic layer surface roughness Ra equal to or smaller than 1.8 nm. Details of this point will be described later.

It is thought that the decrease in reproduction output occurs because components derived from the magnetic tape are attached to the head from the surface of the magnetic layer due to continuous sliding between the surface of the magnetic layer and the head at the time of repeating the running of the magnetic tape, and the attached components (hereinafter, referred to as "head attached materials") exist between the surface of the magnetic layer and the head (so-called spacing loss). Thus, the inventors have made research for decreasing the amount of the components attached to the head from the surface of the magnetic layer. As a result, the inventors have considered that the logarithmic decrement and the ΔSFD set as described above contribute to a decrease in amount of the components attached to the head from the surface of the magnetic layer. The logarithmic decrement and the ΔSFD will be described later specifically. By doing so, the magnetic tape according to one aspect of the invention has been completed. However, the above and following descriptions include the surmise of the inventors. The invention is not limited to such a surmise.

Logarithmic Decrement

The logarithmic decrement acquired by a pendulum viscoelasticity test performed regarding the surface of the magnetic layer of the magnetic tape is equal to or smaller than 0.050. This can contribute to prevention of a decrease in reproduction output, in a case of the repeated running of the magnetic tape having the magnetic layer surface roughness Ra in the range described above. From a viewpoint of further preventing a decrease in reproduction output, the logarithmic decrement is preferably equal to or smaller than 0.048, more preferably equal to or smaller than 0.045, even more preferably equal to or smaller than 0.040, and still more preferably equal to or smaller than 0.035. In addition, the logarithmic decrement can be, for example, equal to or greater than 0.010 or equal to or greater than 0.015. From a viewpoint of preventing a decrease in reproduction output, the logarithmic decrement tends to be preferable, as it is low. Therefore, the logarithmic decrement may be lower than the lower limit exemplified above.

In the invention and the specification, the logarithmic decrement described above is a value acquired by the following method.

Figure 2:
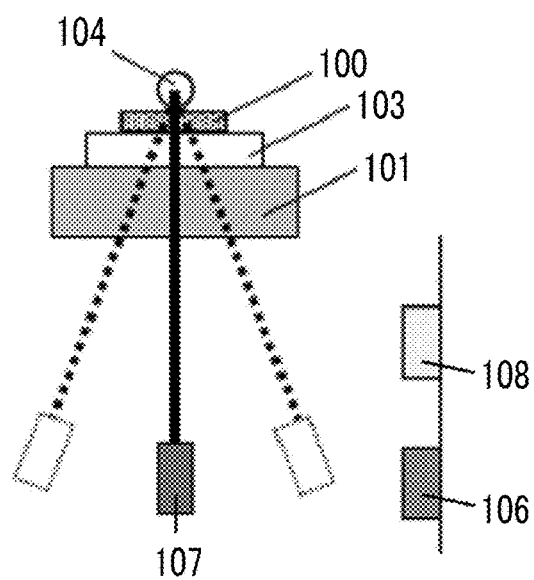
FIG. 2 is an explanatory diagram of the measurement method of a logarithmic decrement.
Figure 3:
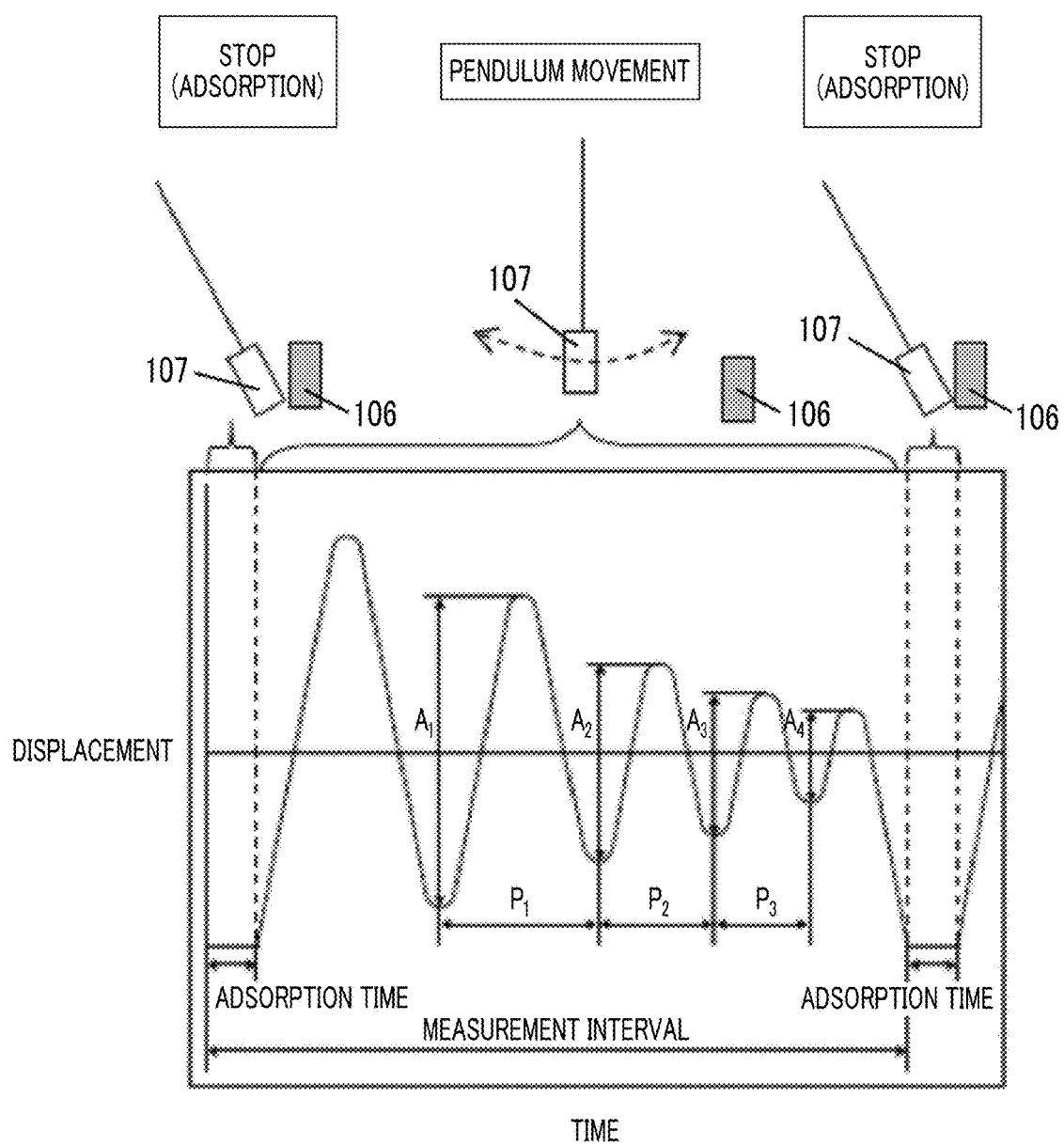
FIG. 3 is an explanatory diagram of the measurement method of a logarithmic decrement.

FIGS. 1 to 3 are explanatory diagrams of a measurement method of the logarithmic decrement. Hereinafter, the measurement method of the logarithmic decrement will be described with reference to the drawings. However, the aspect shown in the drawing is merely an example and the invention is not limited thereto.

A measurement sample 100 is cut out from the magnetic tape which is a measurement target. The cut-out measurement sample 100 is placed on a substrate 103 so that a measurement surface (surface of the magnetic layer) faces upwards, in a sample stage 101 in a pendulum viscoelasticity tester, and the measurement sample is fixed by fixing tapes 105 in a state where obvious wrinkles which can be visually confirmed are not generated.

A pendulum-attached columnar cylinder edge 104 (diameter of 4 mm) having mass of 13 g is loaded on the measurement surface of the measurement sample 100 so that a long axis direction of the cylinder edge becomes parallel to a longitudinal direction of the measurement sample 100. An example of a state in which the pendulum-attached columnar cylinder edge 104 is loaded on the measurement surface of the measurement sample 100 as described above (state seen from the top) is shown in FIG. 1. In the aspect shown in FIG. 1, a holder and temperature sensor 102 is installed and a temperature of the surface of the substrate 103 can be monitored. However, this configuration is not essential. In the aspect shown in FIG. 1, the longitudinal direction of the measurement sample 100 is a direction shown with an arrow in the drawing, and is a longitudinal direction of a magnetic tape from which the measurement sample is cut out. In the invention and the specification, the description regarding "parallel" includes a range of errors allowed in the technical field of the invention. For example, the range of errors means a range less than ±10° from an exact parallel state, and the error from the exact parallel state is preferably within ±5° and more preferably within ±3°. In addition, as a pendulum 107 (see FIG. 2), a pendulum formed of a material having properties of being adsorbed to a magnet (for example, formed of metal or formed of an alloy) is used.

The temperature of the surface of the substrate 103 on which the measurement sample 100 is placed is set to 80° C. by increasing the temperature at a rate of temperature increase equal to or lower than 5° C./min (arbitrary rate of temperature increase may be set, as long as it is equal to or lower than 5° C./min), and the pendulum movement is started (induce initial vibration) by releasing adsorption between the pendulum 107 and a magnet 106. An example of a state of the pendulum 107 which performs the pendulum movement (state seen from the side) is shown in FIG. 2. In the aspect shown in FIG. 2, in the pendulum viscoelasticity tester, the pendulum movement is started by stopping (switching off) the electricity to the magnet (electromagnet) 106 disposed on the lower side of the sample stage to release the adsorption, and the pendulum movement is stopped by restarting (switching on) the electricity to the electromagnet to cause the pendulum 107 to be adsorbed to the magnetic 106. As shown in FIG. 2, during the pendulum movement, the pendulum 107 reciprocates the amplitude. From a result obtained by monitoring displacement of the pendulum with a displacement sensor 108 while the pendulum reciprocates the amplitude, a displacement-time curve in which a vertical axis indicates the displacement and a horizontal axis indicates the elapsed time is obtained. An example of the displacement-time curve is shown in FIG. 3. FIG. 3 schematically shows correspondence between the state of the pendulum 107 and the displacement-time curve. The stop (adsorption) and the pendulum movement are repeated at a regular measurement interval, the logarithmic decrement $\Delta$ (no unit) is acquired from the following Expression by using a displacement-time curve obtained in the measurement interval after 10 minutes or longer (may be arbitrary time, as long as it is 10 minutes or longer) has elapsed, and this value is set as logarithmic decrement of the surface of the magnetic layer of the magnetic tape. The adsorption time of the first adsorption is set as 1 second or longer (may be arbitrary time, as long as it is 1 second or longer), and the interval between the adsorption stop and the adsorption start is set as 6 seconds or longer (may be arbitrary time, as long as it is 6 seconds or longer). The measurement interval is an interval of the time from the adsorption start and the next adsorption start. In addition, humidity of an environment in which the pendulum movement is performed, may be arbitrary relative humidity, as long as the relative humidity is 40% to 70%.

$$\Delta = \frac{\ln\left(\frac{A_1}{A_2}\right) + \ln\left(\frac{A_2}{A_3}\right) + \cdots \ln\left(\frac{A_n}{A_{n+1}}\right)}{n}$$

In the displacement-time curve, an interval between a point of the minimum displacement and a point of the next minimum displacement is set as a period of a wave. n indicates the number of waves included in the displacement-time curve in the measurement interval, and An indicates the minimum displacement and maximum displacement of the n-th wave. In FIG. 3, an interval between the minimum displacement of the n-th wave and the next minimum displacement is shown as Pn (for example, $P_1$ regarding the first wave, $P_2$ regarding the second wave, and $P_3$ regarding the third wave). In the calculation of the logarithmic decrement, a difference (in Expression $A_{n+1}$, in the displacement-time curve shown in FIG. 3, $A_4$) between the minimum displacement and the maximum displacement appearing after the n-th wave is also used, but a part where the pendulum 107 stops (adsorption) after the maximum displacement is not used in the counting of the number of waves. In addition, a part where the pendulum 107 stops (adsorption) before the maximum displacement is not used in the counting of the number of waves, either. Accordingly, the number of waves is 3 (n=3) in the displacement-time curve shown in FIG. 3.

The inventors have considered regarding the logarithmic decrement described above as follows. However, the below description is merely a surmise and the invention is not limited thereto.

It is possible to improve electromagnetic conversion characteristics by increasing the surface smoothness of the surface of the magnetic layer of the magnetic tape. Meanwhile, it is thought that, in a case where the surface smoothness is increased, a contact area (so-called real contact area) between the surface of the magnetic layer and the head during repeated running increases. Accordingly, the inventors have surmised that components derived from the magnetic tape are easily attached to the head from the surface of the magnetic layer and are attached and accumulated on the head while repeating the running, thereby causing spacing loss which is a reason of a decrease in reproduction output. With respect to this, the inventors have thought that the components attached and accumulated on the head include pressure sensitive adhesive components separated from the surface of the magnetic layer. In addition, the inventors have considered that the logarithmic decrement is a value which may be an index for the amount of the pressure sensitive adhesive components and the value equal to or smaller than 0.050 means a decrease in amount of the pressure sensitive adhesive components attached to the head from the surface of the magnetic layer. The details of the pressure sensitive adhesive components are not clear, but the inventors have surmised that the pressure sensitive adhesive components may be derived from a resin used as a binding agent. The specific description is as follows. As a binding agent, various resins can be used as will be described later in detail. The resin is a polymer (including a homopolymer or a copolymer) of two or more polymerizable compounds and generally also includes a component having a molecular weight which is smaller than an average molecular weight (hereinafter, referred to as a "binding agent component having a low molecular weight"). The inventors have surmised that the binding agent component having a low molecular weight which is separated from the surface of the magnetic layer during the running and attached and accumulated on the head while repeating the running may cause the spacing loss which is a reason of a decrease in reproduction output. The inventors have surmised that, the binding agent component having a low molecular weight may have pressure sensitive adhesive properties and the logarithmic decrement acquired by a pendulum viscoelasticity test may be an index for the amount of the component attached and accumulated on the head during the running. In one aspect, the magnetic layer is formed by applying a magnetic layer forming composition including a curing agent in addition to ferromagnetic powder and a binding agent onto a non-magnetic support directly or with another layer interposed therebetween, and performing curing process. With the curing process here, it is possible to allow a curing reaction (crosslinking reaction) between the binding agent and the curing agent. However, although the reason thereof is not clear, the inventors have considered that the binding agent component having a low molecular weight may have poor reactivity regarding the curing reaction. Accordingly, the inventors have surmised that the binding agent component having a low molecular weight which hardly remains in the magnetic layer and is easily separated from the magnetic layer and attached to the head may be one of reasons for that the binding agent component having a low molecular weight is attached and accumulated on the head during the running.

A specific aspect of a method for adjusting the logarithmic decrement will be described later.

ΔSFD

In the magnetic tape, the ΔSFD calculated in the longitudinal direction of the magnetic tape by Expression 1 is equal to or greater than 0.35. It is thought that the ΔSFD is a value which may be an index for a state of ferromagnetic powder present in the magnetic layer. It is surmised that, a state in which the ΔSFD is equal to or smaller than 0.35 is a state in which particles of ferromagnetic powder are suitably randomly present in the magnetic layer, and such a state contributes to an increase in strength of the magnetic layer. By increasing strength of the magnetic layer, it is possible to prevent chipping of the surface of the magnetic layer due to sliding between the surface of the magnetic layer and the head and generation of cut scraps which become head attached materials. That is, it is thought that the ΔSFD equal to or greater than 0.35 contributes to a decrease in amount of the head attached materials causing the spacing loss which is a reason of a decrease in reproduction output due to an increase in strength of the magnetic layer. The ΔSFD is preferably equal to or greater than 0.40, more preferably equal to or greater than 0.50, even more preferably equal to or greater than 0.60, still preferably equal to or greater than 0.70, and still more preferably equal to or greater than 0.80. In one aspect, the ΔSFD can be, for example, equal to or smaller than 1.80. Meanwhile, it is thought that, as a value of the ΔSFD is small, particles of the ferromagnetic powder are aligned by strong interaction. The strong interaction between the particles of the ferromagnetic powder is preferable, in order to increase in retainability of recording of a magnetic tape. According to the magnetic tape having high retainability of recording, it is possible to stably retain information recorded on the magnetic tape for a long period of time. From a viewpoint of retainability of recording, the ΔSFD is preferably equal to or smaller than 1.50, more preferably equal to or smaller than 1.45, even more preferably equal to or smaller than 1.40, still preferably equal to or smaller than 1.20, still more preferably equal to or smaller than 1.00, and still even more preferably 0.85.

The SFD in a longitudinal direction of the magnetic tape can be measured by using a well-known magnetic properties measurement device such as an oscillation sample type magnetic-flux meter. The same applies to the measurement of the SFD of the ferromagnetic powder. In addition, a measurement temperature of the SFD can be adjusted by setting the measurement device.

According to the studies of the inventors, the value of the ΔSFD calculated by Expression 1 can be controlled by a preparation method of the magnetic tape, and mainly the following tendencies were seen: (A) the value decreases, as dispersibility of ferromagnetic powder in the magnetic layer increases; (B) the value decreases, as ferromagnetic powder having small temperature dependency of SFD is used as the ferromagnetic powder; and (C) the value decreases, as the particles of the ferromagnetic powder are aligned in a longitudinal direction of the magnetic layer (as a degree of orientation in a longitudinal direction increases), and the value increases, as a degree of orientation in a longitudinal direction decreases.

For example, regarding (A), dispersion conditions are reinforced (an increase in dispersion time, a decrease in diameter and/or an increase in degree of filling of dispersion beads used in the dispersion, and the like), and a dispersing agent is used. As a dispersing agent, a well-known dispersing agent or a commercially available dispersing agent can be used.

Meanwhile, regarding (B), as an example, ferromagnetic powder in which a difference $\Delta SFD_{powder}$ between SFD of the ferromagnetic powder measured at a temperature of 100° C. and SFD thereof measured at a temperature of 25° C., which are calculated by Expression 2 is 0.05 to 1.50, can be used, for example. However, even in a case where the difference $\Delta SFD_{powder}$ is not in the range described above, it is possible to control the ΔSFD of the magnetic tape calculated by Expression 1 to be equal to or greater than 0.35 by other controlling methods.

$$\Delta SFD_{powder} = SFD_{powder100°\,C.} - SFD_{powder25°\,C.} \qquad \text{Expression 2}$$

(In Expression 2, the $SFD_{powder100°\,C.}$ is a switching field distribution SFD of ferromagnetic powder measured at a temperature of 100° C., and the $SFD_{powder25°\,C.}$ is a switching field distribution SFD of ferromagnetic powder measured at a temperature of 25° C.)

Regarding (C), a method of performing the orientation process of the magnetic layer as homeotropic alignment or a method setting non-orientation without performing the orientation process can be used.

Accordingly, for example, it is possible to obtain a magnetic tape in which the ΔSFD calculated by Expression 1 is equal to or greater than 0.35, by respectively controlling one of the methods (A) to (C) or a combination of two or more arbitrary methods.

Hereinafter, the magnetic tape will be described later more specifically.

Magnetic Layer

Ferromagnetic Powder

As the ferromagnetic powder included in the magnetic layer, ferromagnetic powder normally used in the magnetic layer of various magnetic recording media can be used. It is preferable to use ferromagnetic powder having a small average particle size, from a viewpoint of improvement of recording density of the magnetic tape. From this viewpoint, ferromagnetic powder having an average particle size equal to or smaller than 50 nm is preferably used as the ferromagnetic powder. Meanwhile, the average particle size of the ferromagnetic powder is preferably equal to or greater than 10 nm, from a viewpoint of stability of magnetization.

In one aspect, it is preferable to use ferromagnetic powder in which the difference $\Delta SFD_{powder}$ between the SFD measured at a temperature of 100° C. and the SFD measured at a temperature of 25° C., which are calculated by Expression 2 is in the range described above.

As a preferred specific example of the ferromagnetic powder, ferromagnetic hexagonal ferrite powder can be used. An average particle size of the ferromagnetic hexagonal ferrite powder is preferably 10 nm to 50 nm and more preferably 20 nm to 50 nm, from a viewpoint of improvement of recording density and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. An average particle size of the ferromagnetic metal powder is preferably 10 nm to 50 nm and more preferably 20 nm to 50 nm, from a viewpoint of improvement of recording density and stability of magnetization. For details of the ferromagnetic metal powder, descriptions disclosed in paragraphs 0137 to 0141 of JP2011-216149A and paragraphs 0009 to 0023 of JP2005-251351A can be referred to, for example.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles arbitrarily extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate directly come into contact with each other, and also includes an aspect in which a binding agent or an additive which will be described later is interposed between the particles. A term "particles" is also used for describing the powder.

As a method of collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter, and an average plate ratio is an arithmetical mean of (maximum long diameter/thickness or height). In a case of the definition (3), the average particle size is an average diameter (also referred to as an average particle diameter).

The content (filling percentage) of the ferromagnetic powder of the magnetic layer is preferably 50 to 90 mass % and more preferably 60 to 90 mass %. The components other than the ferromagnetic powder of the magnetic layer are at least a binding agent and one or more of additives may be arbitrarily included. A high filling percentage of the ferromagnetic powder in the magnetic layer is preferable from a viewpoint of improvement recording density.

Binding Agent

The magnetic tape is a coating type magnetic tape, and the magnetic layer includes a binding agent together with the ferromagnetic powder. As the binding agent, one or more kinds of resin is used. The resin may be a homopolymer or a copolymer. As the binding agent, various resins normally used as a binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0028 to 0031 of JP2010-24113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC). As the measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of strength of each layer such as the magnetic layer.

Additive

The magnetic layer includes ferromagnetic powder and a binding agent and may further include one or more additives, if necessary. As the additives, the curing agent described above is used as an example. In addition, examples of the additive which can be included in the magnetic layer include a non-magnetic filler, a lubricant, a dispersing agent, a dispersing assistant, an antifungal agent, an antistatic agent, an antioxidant, and carbon black. The non-magnetic filler is identical to the non-magnetic powder.

As one aspect of the non-magnetic filler, an abrasive can be used. The abrasive means non-magnetic powder having Mohs hardness exceeding 8 and is preferably non-magnetic powder having Mohs hardness equal to or greater than 9. The abrasive may be powder of inorganic substances (inorganic powder) or may be powder of organic substances (organic powder), and is preferably inorganic powder. The abrasive is more preferably inorganic powder having Mohs hardness exceeding 8 and even more preferably inorganic powder having Mohs hardness equal to or greater than 9. A maximum value of Mohs hardness is 10 of diamond. Specifically, powders of alumina ($Al_2O_3$), silicon carbide, boron carbide ($B_4C$), TiC, cerium oxide, zirconium oxide ($ZrO_2$), diamond, and the like can be used as the abrasive, and among these, alumina powder is preferable. For the alumina powder, a description disclosed in a paragraph 0021 of JP2013-229090A can be referred to. In addition, a specific surface area can be used as an index of a particle size of the abrasive. A great value of the specific surface area means a small particle size. From a viewpoint of decreasing the magnetic layer surface roughness Ra, an abrasive having a specific surface area measured by Brunauer-Emmett-Teller (BET) method (hereinafter, referred to as a "BET specific surface area") which is equal to or greater than 14 $m^2/g$, is preferably used. In addition, from a viewpoint of dispersibility, an abrasive having a BET specific surface area equal to or smaller than 40 $m^2/g$, is preferably used. The content of the abrasive in the magnetic layer is preferably 1.0 to 20.0 parts by mass with respect to 100.0 parts by mass of the ferromagnetic powder.

As one aspect of the non-magnetic filler, a non-magnetic filler (hereinafter, referred to as a "projection formation agent") which can function as a projection formation agent which forms projections suitably protruded from the surface of the magnetic layer can be used. The projection formation agent is a component which can contribute to the controlling of friction properties of the surface of the magnetic layer. As the projection formation agent, various non-magnetic powders normally used as a projection formation agent can be used. These may be inorganic powder or organic powder. In one aspect, from a viewpoint of homogenization of friction properties, particle size distribution of the projection formation agent is not polydispersion having a plurality of peaks in the distribution and is preferably monodisperse showing a single peak. From a viewpoint of availability of monodisperse particles, the projection formation agent is preferably inorganic powder. Examples of the inorganic powder include powder of metal oxide, metal carbonate, metal sulfate, metal nitride, metal carbide, and metal sulfide, and powder of inorganic oxide is preferable. The projection formation agent is more preferably colloidal particles and even more preferably inorganic oxide colloidal particles. In addition, from a viewpoint of availability of monodisperse particles, the inorganic oxide configuring the inorganic oxide colloidal particles are preferably silicon dioxide (silica). The inorganic oxide colloidal particles are more preferably colloidal silica (silica colloidal particles). In the invention and the specification, the "colloidal particles" are particles which are not precipitated and dispersed to generate a colloidal dispersion, in a case where 1 g of the particles is added to 100 mL of at least one organic solvent of at least methyl ethyl ketone, cyclohexanone, toluene, or ethyl acetate, or a mixed solvent including two or more kinds of the solvent described above at an arbitrary mixing ratio. In addition, in another aspect, the projection formation agent is preferably carbon black. An average particle size of the projection formation agent is, for example, 30 to 300 nm and is preferably 40 to 200 nm. In addition, from a viewpoint that the projection formation agent can exhibit the functions thereof in an excellent manner, the content of the projection formation agent in the magnetic layer is preferably 1.0 to 4.0 parts by mass and more preferably 1.5 to 3.5 parts by mass with respect to 100.0 parts by mass of the ferromagnetic powder.

As an example of the additive which can be used in the magnetic layer including the abrasive, a dispersing agent disclosed in paragraphs 0012 to 0022 of JP2013-131285A can be used as a dispersing agent for improving dispersibility of the abrasive of the magnetic layer forming composition. It is preferable to improve dispersibility of the abrasive in the magnetic layer forming composition in order to decrease the magnetic layer surface roughness Ra.

As the additives, a commercially available product or an additive prepared by a well-known method can be suitably selected and used according to the desired properties.

Non-Magnetic Layer

Next, the non-magnetic layer will be described. The magnetic tape may include a magnetic layer directly on a non-magnetic support, or may include a non-magnetic layer including non-magnetic powder and a binding agent between the non-magnetic support and the magnetic layer. The non-magnetic powder used in the non-magnetic layer may be inorganic powder or organic powder. In addition, carbon black and the like can be used. Examples of the inorganic powder include powder of metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50 to 90 mass % and more preferably 60 to 90 mass %.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the invention and the specification includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Back Coating Layer

The magnetic tape can also include a back coating layer including non-magnetic powder and a binding agent on a surface side of the non-magnetic support opposite to the surface provided with the magnetic layer. The back coating layer preferably includes any one or both of carbon black and inorganic powder. In regards to the binding agent included in the back coating layer and various additives which can be arbitrarily included in the back coating layer, a well-known technology regarding the treatment of the magnetic layer and/or the non-magnetic layer can be applied.

Non-Magnetic Support

Next, the non-magnetic support (hereinafter, also simply referred to as a "support") will be described. As the non-magnetic support, well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heating treatment may be performed with respect to these supports in advance.

Various Thickness

A thickness of the non-magnetic support of the magnetic tape is preferably 3.00 to 80.00 µm, more preferably 3.00 to 6.00 µm, and even more preferably 3.00 to 4.50 µm.

A thickness of the magnetic layer can be optimized in accordance with saturation magnetization quantity of the magnetic head used, a head gap length, or a band of a recording signal. The thickness of the magnetic layer is normally 10 nm to 150 nm, and is preferably 20 nm to 120 nm and more preferably 30 nm to 100 nm, from a viewpoint of realizing high-density recording. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is the total thickness of the layers.

A thickness of the non-magnetic layer is, for example, 0.01 to 3.00 µm, preferably 0.05 to 2.00 µm, and more preferably 0.05 to 1.50 µm.

A thickness of the back coating layer is preferably equal to or smaller than 0.90 and more preferably 0.10 to 0.70 µm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scanning electron microscope. In the cross section observation, various thicknesses can be acquired as a thickness acquired at one position of the cross section in the thickness direction, or an arithmetical mean of thicknesses acquired at a plurality of positions of two or more positions, for example, two positions which are arbitrarily extracted. In addition, the thickness of each layer may be acquired as a designed thickness calculated according to the manufacturing conditions.

Manufacturing Method

Preparation of Each Layer Forming Composition

Each composition for forming the magnetic layer, the non-magnetic layer, or the back coating layer normally includes a solvent, together with various components described above. As the solvent, various organic solvents generally used for manufacturing a coating type magnetic recording medium can be used. Among those, from a viewpoint of solubility of the binding agent normally used in the coating type magnetic recording medium, each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent of each layer forming composition is not particularly limited, and can be set to be the same as that of each layer forming composition of a typical coating type magnetic recording medium. In addition, steps of preparing each layer forming composition generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. In the preparation of the magnetic layer forming composition, it is preferable that the ferromagnetic powder and the abrasive are separately dispersed as described above. In addition, in order to manufacture the magnetic tape, a well-known manufacturing technology can be used. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP 1989-79274A (JP-H01-79274A). In addition, in order to disperse each layer forming composition, glass beads and one or more kinds of other dispersion beads can be used as a dispersion medium. As such dispersion beads, zirconia beads, titania beads, and steel beads which are dispersion beads having high specific gravity are suitable. The dispersion beads can be used by optimizing a bead diameter and a filling percentage of the dispersion beads. As a dispersing machine, a well-known dispersing machine can be used. Each layer forming composition may be filtered by a well-known method before performing the coating step. The filtering can be performed by using a filter, for example. As the filter used in the filtering, a filter having a hole diameter of 0.01 to 3 µm can be used, for example. As described above, as one of means for obtaining a magnetic tape having the ΔSFD calculated by Expression 1 equal to or greater than 0.35, a technology of reinforcing the dispersion conditions (for example, increasing the dispersion time, decreasing the diameter of the dispersion beads used for dispersion and/or increasing the filling percentage, and the like) is also preferable. For details of the manufacturing method of the magnetic tape, descriptions disclosed in paragraphs 0051 to 0057 of JP2010-24113A can also be referred to, for example. For the orientation process, a description disclosed in a paragraph 0052 of JP2010-24113A can be referred to. As described above, as one of means for obtaining a magnetic tape having the ΔSFD calculated by Expression 1 equal to or greater than 0.35, it is preferable to perform the homeotropic alignment. In addition, it is also preferable that the orientation process is not performed (non-orientation).

Coating Step, Cooling Step, Heating and Drying Step, Burnishing Treatment Step, and Curing Step The magnetic layer can be formed by directly applying the magnetic layer forming composition onto the non-magnetic support or performing multilayer coating of the magnetic layer forming composition with the non-magnetic layer forming composition in order or at the same time. For details of the coating for forming each layer, a description disclosed in a paragraph 0066 of JP2010-231843A can be referred to.

In a preferred aspect, a magnetic layer can be formed through a magnetic layer forming step including a coating step of applying a magnetic layer forming composition including ferromagnetic powder, a binding agent, an abrasive, a curing agent, and a solvent onto a non-magnetic support directly or with another layer interposed therebetween, to form a coating layer, a heating and drying step of drying the coating layer by a heating process, and a curing step of performing a curing process with respect to the coating layer. The magnetic layer forming step preferably includes a cooling step of cooling the coating layer between the coating step and the heating and drying step, and more preferably includes a burnishing treatment step of performing a burnishing treatment with respect to the surface of the coating layer between the heating and drying step and the curing step.

The inventors have thought that it is preferable that the cooling step and the burnishing treatment step in the magnetic layer forming step, in order to set the logarithmic decrement to be equal to or smaller than 0.050. More specific description is as follows.

The inventors have surmised that performing the cooling step of cooling the coating layer between the coating step and the heating and drying step contributes to causing pressure sensitive adhesive component separated from the surface of the magnetic layer in a case where the head comes into contact with and slides on the surface of the magnetic layer, to be localized in the surface and/or a surface layer part in the vicinity of the surface of the coating layer. The inventors have surmised that this is because the pressure sensitive adhesive component at the time of solvent volatilization in the heating and drying step is easily moved to the surface and/or the surface layer part of the coating layer, by cooling the coating layer of the magnetic layer forming composition before the heating and drying step. However, the reason thereof is not clear. In addition, the inventors have thought that the pressure sensitive adhesive component can be removed by performing the burnishing treatment with respect to the surface of the coating layer in which the pressure sensitive adhesive component is localized on the surface and/or surface layer part. The inventors have surmised that performing the curing step after removing the pressure sensitive adhesive component contributes setting the logarithmic decrement to be equal to or smaller than 0.050. However, this is merely a surmise, and the invention is not limited thereto.

As described above, multilayer coating of the magnetic layer forming composition can be performed with the non-magnetic layer forming composition in order or at the same time. In a preferred aspect, the magnetic tape can be manufactured by successive multilayer coating. A manufacturing step including the successive multilayer coating can be preferably performed as follows. The non-magnetic layer is formed through a coating step of applying a non-magnetic layer forming composition onto a non-magnetic support to form a coating layer, and a heating and drying step of drying the formed coating layer by a heating process. In addition, the magnetic layer is formed through a coating step of applying a magnetic layer forming composition onto the formed non-magnetic layer to form a coating layer, and a heating and drying step of drying the formed coating layer by a heating process.

Hereinafter, a specific aspect of the manufacturing method of the magnetic tape will be described with reference to FIG. 4. However, the invention is not limited to the following specific aspect.

Figure 4:
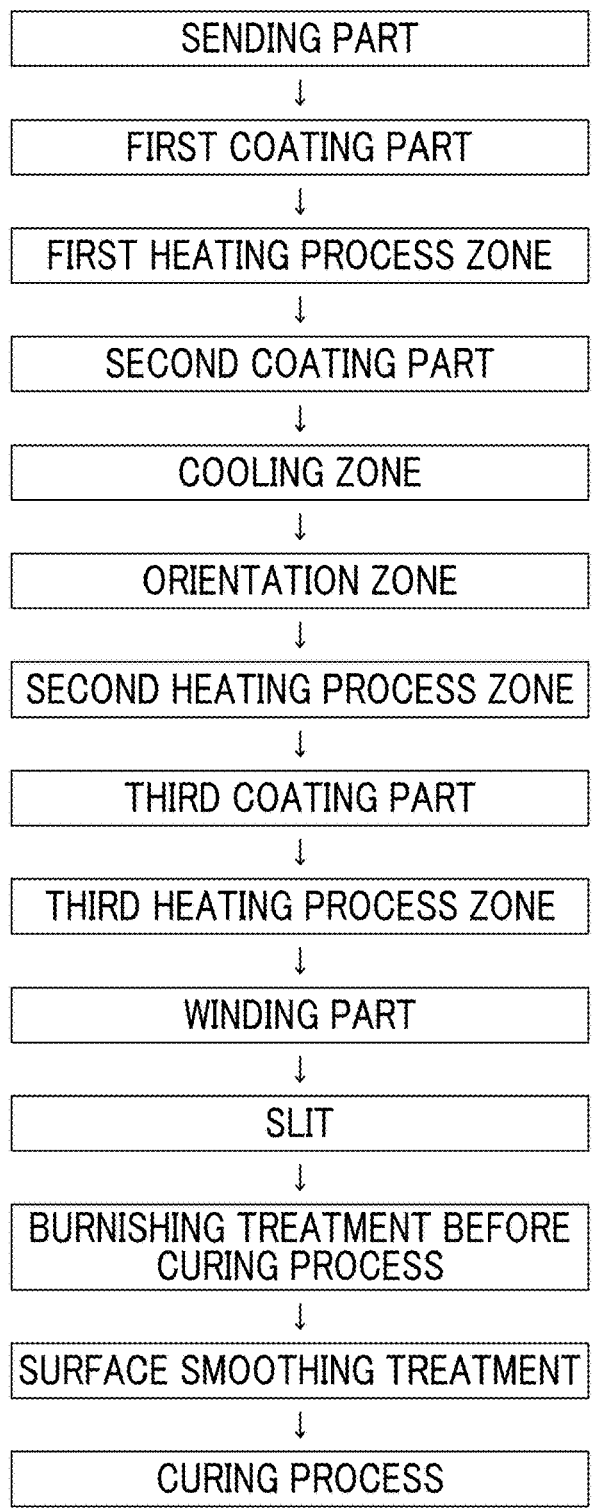
FIG. 4 shows an example (step schematic view) of a specific aspect of a magnetic tape manufacturing step.

FIG. 4 is a step schematic view showing a specific aspect of a step of manufacturing the magnetic tape including a non-magnetic layer and a magnetic layer in this order on one surface of a non-magnetic support and including a back coating layer on the other surface thereof. In the aspect shown in FIG. 4, an operation of sending a non-magnetic support (elongated film) from a sending part and winding the non-magnetic support around a winding part is continuously performed, and various processes of coating, drying, and orientation are performed in each part or each zone shown in FIG. 4, and thus, it is possible to sequentially form a non-magnetic layer and a magnetic layer on one surface of the running non-magnetic support by multilayer coating and to form a back coating layer on the other surface thereof. Such a manufacturing method can be set to be identical to the manufacturing method normally performed for manufacturing a coating type magnetic recording medium, except for including a cooling zone in the magnetic layer forming step and including the burnishing treatment step before the curing process.

The non-magnetic layer forming composition is applied onto the non-magnetic support sent from the sending part in a first coating part (coating step of non-magnetic layer forming composition).

After the coating step, in a first heating process zone, the coating layer of the non-magnetic layer forming composition formed in the coating step is heated after to dry the coating layer (heating and drying step). The heating and drying step can be performed by causing the non-magnetic support including the coating layer of the non-magnetic layer forming composition to pass through the heated atmosphere. An atmosphere temperature of the heated atmosphere here can be, for example, approximately 60° to 140°. Here, the atmosphere temperature may be a temperature at which the solvent is volatilized and the coating layer is dried, and the atmosphere temperature is not limited to the range described above. In addition, the heated air may arbitrarily blow to the surface of the coating layer. The points described above are also applied to a heating and drying step of a second heating process zone and a heating and drying step of a third heating process zone which will be described later, in the same manner.

Next, in a second coating part, the magnetic layer forming composition is applied onto the non-magnetic layer formed by performing the heating and drying step in the first heating process zone (coating step of magnetic layer forming composition).

After the coating step, a coating layer of the magnetic layer forming composition formed in the coating step is cooled in a cooling zone (cooling step). For example, it is possible to perform the cooling step by allowing the non-magnetic support on which the coating layer is formed on the non-magnetic layer to pass through a cooling atmosphere. An atmosphere temperature of the cooling atmosphere is preferably −10° C. to 0° C. and more preferably −5° C. to 0° C. The time for performing the cooling step (for example, time while an arbitrary part of the coating layer is delivered to and sent from the cooling zone (hereinafter, also referred to as a "staying time")) is not particularly limited. In a case where the staying time is long, the value of logarithmic decrement tends to be increased. Thus, the staying time is preferably adjusted by performing preliminary experiment if necessary, so that the logarithmic decrement equal to or smaller than 0.050 is realized. In the cooling step, cooled air may blow to the surface of the coating layer.

After that, in the aspect of performing the orientation process, while the coating layer of the magnetic layer forming composition is wet, an orientation process of the ferromagnetic powder in the coating layer is performed in an orientation zone.

The coating layer after the orientation process is subjected to the heating and drying step in the second heating process zone.

Next, in the third coating part, a back coating layer forming composition is applied to a surface of the non-magnetic support on a side opposite to the surface where the non-magnetic layer and the magnetic layer are formed, to form a coating layer (coating step of back coating layer forming composition). After that, the coating layer is heated and dried in the third heating process zone.

By doing so, it is possible to obtain the magnetic tape including the coating layer of the magnetic layer forming composition heated and dried on the non-magnetic layer, on one surface side of the non-magnetic support, and the back coating layer on the other surface side thereof. The magnetic tape obtained here becomes a magnetic tape product after performing various processes which will be described later.

The obtained magnetic tape is wound around the winding part, and cut (slit) to have a size of a magnetic tape product. The slitting is performed by using a well-known cutter.

In the slit magnetic tape, the burnishing treatment is performed with respect to the surface of the heated and dried coating layer of the magnetic layer forming composition, before performing the curing process (heating and light irradiation) in accordance with the types of the curing agent included in the magnetic layer forming composition (burnishing treatment step between heating and drying step and curing step). The inventors have surmised that removing the pressure sensitive adhesive component transitioned to the surface and/or the surface layer part of the coating layer cooled in the cooling zone by the burnishing treatment contributes setting the logarithmic decrement to be equal to or smaller than 0.050. However, this is merely a surmise, and the invention is not limited thereto.

The burnishing treatment is treatment of rubbing a surface of a treatment target with a member (for example, a polishing tape, or a grinding tool such as a grinding blade or a grinding wheel), and can be performed in the same manner as the well-known burnishing treatment for manufacturing a coating type magnetic recording medium. However, in the related art, the burnishing treatment was not performed in a stage before the curing step, after performing the cooling step and the heating and drying step. With respect to this, the logarithmic decrement can be equal to or smaller than 0.050 by performing the burnishing treatment in the stage described above.

The burnishing treatment can be preferably performed by performing one or both of rubbing of the surface of the coating layer of the treatment target by a polishing tape (polishing) and rubbing of the surface of the coating layer of the treatment target by a grinding tool (grinding). In a case where the magnetic layer forming composition includes an abrasive, it is preferable to use a polishing tape including at least one of an abrasive having higher Mohs hardness than that of the abrasive described above. As the polishing tape, a commercially available product may be used and a polishing tape manufactured by a well-known method may be used. As the grinding tool, a well-known blade such as a fixed blade, a diamond wheel, or a rotary blade, or a grinding blade can be used. In addition, a wiping treatment of wiping the surface of the coating layer rubbed by the polishing tape and/or the grinding tool with a wiping material. For details of preferred polishing tape, grinding tool, burnishing treatment, and wiping treatment, descriptions disclosed in paragraphs 0034 to 0048, FIG. 1 and examples of JP1994-52544A (JP-H06-52544A) can be referred to. As the burnishing treatment is reinforced, the value of the logarithmic decrement tends to be decreased. The burnishing treatment can be reinforced as an abrasive having high hardness is used as the abrasive included in the polishing tape, and can be reinforced, as the amount of the abrasive in the polishing tape is increased. In addition, the burnishing treatment can be reinforced as a grinding tool having high hardness is used as the grinding tool. In regards to the burnishing treatment conditions, the burnishing treatment can be reinforced as a sliding speed between the surface of the coating layer of the treatment target and a member (for example, a polishing tape or a grinding tool) is increased. The sliding speed can be increased by increasing one or both of a speed at which the member is moved, and a speed at which the magnetic tape of the treatment target is moved.

After the burnishing treatment (burnishing treatment step), the curing process is performed with respect to the coating layer of the magnetic layer forming composition. In the aspect shown in FIG. 4, the coating layer of the magnetic layer forming composition is subjected to the surface smoothing treatment, after the burnishing treatment and before the curing process. The surface smoothing treatment is preferably performed by a calender process. For details of the calender process, for example, description disclosed in a paragraph 0026 of JP2010-231843A can be referred to. As the calender process is reinforced, the surface of the magnetic tape can be smoothened. The calender process is reinforced, as the surface temperature (calender temperature) of a calender roll is increased and/or as calender pressure is increased.

After that, the curing process according to the type of the curing agent included in the coating layer is performed with respect to the coating layer of the magnetic layer forming composition (curing step). The curing process can be performed by the process according to the type of the curing agent included in the coating layer, such as a heating process or light irradiation. The curing process conditions are not particularly limited, and the curing process conditions may be suitably set in accordance with the list of the magnetic layer forming composition used in the coating layer formation, the type of the curing agent, and the thickness of the coating layer. For example, in a case where the coating layer is formed by using the magnetic layer forming composition including polyisocyanate as the curing agent, the curing process is preferably the heating process. In a case where the curing agent is included in a layer other than the magnetic layer, a curing reaction of the layer can also be promoted by the curing process here. Alternatively, the curing step may be separately provided. After the curing step, the burnishing treatment may be further performed.

By doing so, it is possible to obtain a magnetic tape according to one aspect of the invention. However, the manufacturing method described above is merely an example, the magnetic layer surface roughness Ra, the logarithmic decrement, and the ΔSFD can be respectively controlled to be in the ranges described above by arbitrary methods capable of adjusting the magnetic layer surface roughness Ra, the logarithmic decrement, and the ΔSFD, and such an aspect is also included in the invention.

The magnetic tape according to one aspect of the invention described above is generally accommodated in a magnetic tape cartridge and the magnetic tape cartridge is mounted in a drive. The configuration of the magnetic tape cartridge and the drive is well known. The magnetic tape runs (is transported) in the drive, the magnetic head for recording and/or reproducing of information comes into contact with and slides on the surface of the magnetic layer, and the recording of the information on the magnetic tape and/or reproducing of the recorded information are performed. A running speed of the magnetic tape is also referred to as a transportation speed and is a relative speed of the magnetic tape and the head at the time of the magnetic tape running. It is preferable that the running speed is increased to cause the magnetic tape run at a high speed, in order to shorten the time necessary for recording information and/or time necessary for reproducing the recorded information. From this viewpoint, the running speed of the magnetic tape is, for example, preferably equal to or higher than 6.0 m/sec. Meanwhile, it was determined that, in the magnetic tape having the magnetic layer surface roughness Ra equal to or smaller than 1.8 nm, a decrease in reproduction output occurs, in a case of repeating the high-speed running in the environment of a high temperature and low humidity, without any measures. With respect to this, in the magnetic tape according to one aspect of the invention in which the magnetic layer surface roughness Ra is equal to or smaller than 1.8 nm and the logarithmic decrement and the ΔSFD are in the ranges described above, a decrease in reproduction output during the repeated high-speed running in the environment of a high temperature and low humidity can be prevented.

EXAMPLES

Hereinafter, the invention will be described with reference to examples. However, the invention is not limited to aspects shown in the examples. "Parts" and "%" in the following description mean "parts by mass" and "mass %", unless otherwise noted. In addition, steps and evaluations described below are performed in an environment of an atmosphere temperature of 23° C.±1° C., unless otherwise noted.

Example 1

1. Manufacturing of Magnetic Tape
(1) Preparation of Alumina Dispersion
3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin having a $SO_3Na$ group as a polar group (UR-4800 (amount of a polar group: 80 meq/kg) manufactured by Toyobo Co., Ltd.), and 570.0 parts of a mixed solution of methyl ethyl ketone and cyclohexanone (mass ratio of 1:1) as a solvent were mixed in 100.0 parts of alumina powder (HIT-80 manufactured by Sumitomo Chemical Co., Ltd.; Mohs hardness of 9) having an gelatinization ratio of approximately 65% and a BET specific surface area of 30 $m^2/g$, and dispersed in the presence of zirconia beads by a paint shaker for 5 hours. After the dispersion, the dispersion liquid and the beads were separated by a mesh and an alumina dispersion was obtained.

(2) Magnetic Layer Forming Composition List
Magnetic Solution
Ferromagnetic powder (Ferromagnetic hexagonal barium ferrite powder): 100.0 parts
  Average particle size and $\Delta SFD_{powder}$ calculated by Expression 2: see Table 1
$SO_3Na$ group-containing polyurethane resin: 14.0 parts
  Weight-average molecular weight: 70,000, $SO_3Na$ group: 0.2 meq/g
Cyclohexanone: 150.0 parts
Methyl ethyl ketone: 150.0 parts
Abrasive Liquid
Alumina dispersion prepared in the section (1): 6.0 parts
Silica Sol (projection formation agent liquid)
Colloidal silica: 2.0 parts
  Average particle size: see Table 1
Methyl ethyl ketone: 1.4 parts
Other Components
Stearic acid: 2.0 parts
Butyl stearate: 6.0 parts
Polyisocyanate (CORONATE (registered trademark) manufactured by Nippon Polyurethane Industry Co., Ltd.): 2.5 parts
Finishing Additive Solvent
Cyclohexanone: 200.0 parts
Methyl ethyl ketone: 200.0 parts
(3) Non-Magnetic Layer Forming Composition List
Non-magnetic inorganic powder: α-iron oxide: 100.0 parts
  Average particle size (average long axis length): 0.15 μm
  Average acicular ratio: 7
  BET specific surface area: 52 $m^2/g$
Carbon black: 20.0 parts
  Average particle size: 20 nm
$SO_3Na$ group-containing polyurethane resin: 18.0 parts
  (Weight-average molecular weight: 70,000, $SO_3Na$ group: 0.2 meq/g)
Stearic acid: 1.0 part
Cyclohexanone: 300.0 parts
Methyl ethyl ketone: 300.0 parts
(4) Back Coating Layer Forming Composition List
Non-magnetic inorganic powder: α-iron oxide: 80.0 parts
  Average particle size (average long axis length): 0.15 μm
  Average acicular ratio: 7
  BET specific surface area: 52 $m^2/g$
Carbon black: 20.0 parts
  Average particle size: 20 nm
A vinyl chloride copolymer: 13.0 parts A sulfonic acid group-containing polyurethane resin: 6.0 parts Phenylphosphonic acid: 3.0 parts Stearic acid: 3.0 parts Butyl stearate: 3.0 parts Polyisocyanate (CORONATE L manufactured by Nippon Polyurethane Industry Co., Ltd.): 5.0 parts Methyl ethyl ketone: 155.0 parts Cyclohexanone: 355.0 parts (5) Preparation of Each Layer Forming Composition (i) Preparation of Magnetic Layer Forming Composition The magnetic layer forming composition was prepared by the following method.

A magnetic solution was prepared by performing beads-dispersing of the magnetic solution components described above by using beads as the dispersion medium in a batch type vertical sand mill (beads dispersion time: see Table 1). Zirconia beads having a bead diameter of 0.5 mm were used as the dispersion beads. The prepared magnetic solution and the abrasive liquid were mixed with other components (silica sol, other components, and finishing additive solvent) and beads-dispersed for 5 minutes by using the sand mill, and ultrasonic dispersion was performed with a batch type ultrasonic device (20 kHz, 300 W) for 0.5 minutes. After that, the obtained mixed solution was filtered by using a filter having a hole diameter of 0.5 µm, and the magnetic layer forming composition was prepared. A part of the prepared magnetic layer forming composition was collected and a dispersion particle diameter which is an index for dispersibility of ferromagnetic powder (ferromagnetic hexagonal barium ferrite powder) was measured by a method which will be described later. The measured value is shown in Table 1.

(ii) Preparation of Non-Magnetic Layer Forming Composition

The non-magnetic layer forming composition was prepared by the following method.

Each component excluding stearic acid, cyclohexanone, and methyl ethyl ketone was beads-dispersed by using a batch type vertical sand mill for 24 hours to obtain dispersion liquid. As the dispersion beads, zirconia beads having a bead diameter of 0.1 mm were used. After that, the remaining components were added into the obtained dispersion liquid and stirred with a dissolver. The dispersion liquid obtained as described above was filtered with a filter having a hole diameter of 0.5 µm and a non-magnetic layer forming composition was prepared.

(iii) Preparation of Back Coating Layer Forming Composition

The back coating layer forming composition was prepared by the following method.

Each component excluding stearic acid, butyl stearate, polyisocyanate, and cyclohexanone was kneaded and diluted by an open kneader. Then, the obtained mixed solution was subjected to a dispersion process of 12 passes, with a transverse beads mill dispersing device by using zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. The dispersion liquid obtained as described above was filtered with a filter having a hole diameter of 1 µm and a back coating layer forming composition was prepared.

(6) Manufacturing of Magnetic Tape

A magnetic tape was manufactured by the specific aspect shown in FIG. 4. The magnetic tape was specifically manufactured as follows.

A support made of polyethylene naphthalate having a thickness of 5.00 µm was sent from the sending part, and the non-magnetic layer forming composition prepared in the section (5)(ii) was applied to one surface thereof so that the thickness after the drying becomes 0.10 inn in the first coating part and was dried in the first heating process zone (atmosphere temperature of 100° C.) to form a coating layer.

Then, the magnetic layer forming composition prepared in the section (5)(i) was applied onto the non-magnetic layer so that the thickness after the drying becomes 70 nm (0.07 µm) in the second coating part, and a coating layer was formed. The cooling step was performed by passing the formed coating layer through the cooling zone in which the atmosphere temperature is adjusted to 0° C. for the staying time shown in Table 1 while the coating layer is wet, and then, the coating layer was dried in the second heating process zone (atmosphere temperature of 100° C.) without performing the orientation process (non-orientation).

After that, in the third coating part, the back coating layer forming composition prepared in the section (5)(iii) was applied to the surface of the support made of polyethylene naphthalate on a side opposite to the surface where the non-magnetic layer and the magnetic layer are formed, so that the thickness after the drying becomes 0.40 to form a coating layer, and the formed coating layer was dried in the third heating process zone (atmosphere temperature of 100° C.).

The magnetic tape obtained as described above was slit to have a width of ½ inches (0.0127 meters), and the burnishing treatment and the wiping treatment were performed with respect to the surface of the coating layer of the magnetic layer forming composition. The burnishing treatment and the wiping treatment were performed by using a commercially available polishing tape (product name: MA22000 manufactured by Fujifilm Corporation, abrasive: diamond/$Cr_2O_3$/red oxide) as the polishing tape, a commercially available sapphire blade (manufactured by Kyocera Corporation, a width of 5 mm, a length of 35 mm, and a tip angle of 60 degrees) as the grinding blade, and a commercially available wiping material (product name: WRP736 manufactured by Kuraray Co., Ltd.) as the wiping material, in a treatment device having a configuration disclosed in FIG. 1 of JP1994-52544A (JP-H06-52544A). For the treatment conditions, the treatment conditions disclosed in Example 12 of JP1994-52544A (JP-H06-52544A).

After the burnishing treatment and the wiping treatment, a calender process (surface smoothing treatment) was performed with a calender roll configured of only a metal roll, at a speed of 80 m/min, linear pressure of 300 kg/cm (294 kN/m), and a calender temperature (surface temperature of a calender roll) shown in Table 1.

After that, a heating process (curing process) was performed in the environment of the atmosphere temperature of 70° C. for 36 hours.

By doing so, a magnetic tape of Example 1 was manufactured.

The thickness of each layer of the manufactured magnetic tape was acquired by the following method and it was confirmed that the acquired thickness is the thickness described above.

A cross section of the magnetic tape in a thickness direction was exposed to ion beams and the exposed cross section was observed with a scanning electron microscope. Various thicknesses were obtained as an arithmetical mean of thicknesses obtained at two portions in the thickness direction in the cross section observation.

A part of the magnetic tape manufactured by the method described above was used in the evaluation of physical properties described below, and the other part was used in the evaluation of performance which will be described later.

2. Evaluation of Ferromagnetic Powder and Magnetic Layer Forming Composition (1) Dispersion Particle Diameter of Magnetic Layer Forming Composition A part of the magnetic layer forming composition prepared as described above was collected, and a sample solution diluted by an organic solvent used in the preparation of the composition to 1/50 based on mass was prepared. Regarding the prepared sample solution, an arithmetic average particle diameter measured by using a light-scattering particle size analyzer (LB500 manufactured by HORIBA, Ltd.) was used as the dispersion particle diameter.

(2) Average Particle Size of Ferromagnetic Powder

An average particle size of the ferromagnetic powder was obtained by the method described above.

(3) $\Delta SFD_{powder}$ of Ferromagnetic Powder

Regarding the ferromagnetic powder, the SFDs were measured at a temperature of 100° C. and a temperature of 25° C. with an applied magnetic field of 796 kA/m (10 kOe) by using an oscillation sample type magnetic-flux meter (manufactured by Toei Industry Co., Ltd.). From measurement results of the SFDs, the $\Delta SFD_{powder}$ was calculated by Expression 2.

3. Evaluation of Physical Properties of Magnetic Tape (1) Center Line Average Surface Roughness Ra Measured Regarding Surface of Magnetic Layer The measurement regarding a measurement area of 40 μm×40 μm in the surface of the magnetic layer of each magnetic tape of the examples and the comparative examples was performed with an atomic force microscope (AFM, Nanoscope 4 manufactured by Veeco Instruments, Inc.) in a tapping mode, and a center line average surface roughness Ra was acquired. RTESP-300 manufactured by BRUKER is used as a probe, a scan speed (probe movement speed) was set as 40 μm/sec, and a resolution was set as 512 pixel×512 pixel.

(2) Measurement of Logarithmic Decrement

The logarithmic decrement of the surface of the magnetic layer of the magnetic tape was acquired by the method described above by using a rigid-body pendulum type physical properties testing instrument RPT-3000W manufactured by A&D Company, Limited (pendulum: brass, substrate: glass substrate, a rate of temperature increase of substrate: 5° C./min) as the measurement device. A measurement sample cut out from the magnetic tape was placed on a glass substrate having a size of approximately 3 cm×approximately 5 cm, by being fixed at 4 portions with a fixing tape (Kapton tape manufactured by Du Pont-Toray Co., Ltd.) as shown in FIG. 1. An adsorption time was set as 1 second, a measurement interval was set as 7 to 10 seconds, a displacement-time curve was drawn regarding the 86-th measurement interval, and the logarithmic decrement was acquired by using this curve. The measurement was performed in the environment of relative humidity of approximately 50%.

(3) $\Delta SFD$

The SFDs were measured in a longitudinal direction of the magnetic tape at a temperature of 25° C. and a temperature of −190° C. with an applied magnetic field of 796 kA/m (10 kOe) by using an oscillation sample type magnetic-flux meter (manufactured by Toei Industry Co., Ltd.). From measurement results, the $\Delta SFD$ in a longitudinal direction of the magnetic tape was calculated by Expression 1.

4. Evaluation of Performance of Magnetic Tape (1) Amount of Reproduction Output During Repeated High-Speed Running in Environment of High Temperature and Low Humidity The amount of a decrease in reproduction output during the repeated running was measured by the following method by using a reel tester having a width of ½ inches (0.0127 meters) and including a fixed head. The measurement was performed in an environment of an atmosphere temperature of 32° C. and relative humidity of 10%.

A head/tape relative speed was set as 8.0 m/sec, a metal-in-gap (MIG) head (gap length of 0.15 μm, track width of 1.0 μm) was used in the recording, and a recording current was set as an optimal recording current of each magnetic tape. As a reproducing head, a giant-magnetoresistive (GMR) head having an element thickness of 15 nm, a shield interval 0.1 μm, and a lead width of 0.5 μm was used. A signal having linear recording density of 300 kfci was recorded and measurement regarding a reproduction signal was performed with a spectrum analyzer manufactured by Shiba-soku Co., Ltd. The unit, kfci, is a unit of linear recording density (not able to convert to the SI unit system). Regarding the signal, a signal which was sufficiently stabilized after starting the running of the magnetic tape was used. The sliding of 500 passes was performed by sliding 1,000 m per 1 pass to perform the reproducing.

An output value of a carrier signal of the first pass and an output value of a carrier signal of 500-th pass were respectively obtained, and a difference of "(output value of 500-th pass)−(output value of first pass)" was shown in Table 1 as the amount of a decrease in reproduction output during the repeated running (2) Retainability of Recording (Signal Attenuation)

The evaluation of retainability of recording was performed by the following method in an environment of 23° C.±1° C.

Regarding the reproduction output of the manufactured magnetic tape, a signal having a linear recording density of 200 kfci was recorded by attaching a recording head (MIG head (gap length of 0.15 μm, 1.8 T)) and a reproducing head (GMR head (reproduction track width of 1.0 μm)) to a loop tester, the recorded signal was continuously reproduced, and signal attenuation of the recorded signal with respect to time from the recording to the reproduction was measured. A small value of the signal attenuation (unit: %/decade) means excellent retainability of recording. A measurement limit of a measurement device is −0.5%/decade, and therefore, a case where the value of the signal attenuation is equal to or smaller than the measurement limit was shown as "equal to or smaller than −0.5" in Table 1.

Examples 2 to 14 and Comparative Examples 1 to 9

Each magnetic tape of Examples 2 to 14 and Comparative Examples 1 to 9 was obtained by the same method as in Example 1, except that various conditions were changed as shown in Table 1.

In Table 1, in the comparative examples in which "none" is shown in a column of the orientation, the magnetic layer was formed without performing the orientation process in the same manner as in Example 1.

In the examples in which "homeotropic" is disclosed in a column of the orientation, the cooling step was performed by passing the coating layer through the cooling zone in which the atmosphere temperature is adjusted to 0° C. for the staying time shown in Table 1 while the coating layer of the magnetic layer forming composition is wet, and then, a homeotropic alignment process was performed by applying a magnetic field having a magnetic field strength of 0.3 T to the surface of the coating layer in a vertical direction. After that, the coating layer was dried in the second heating process zone (atmosphere temperature of 100° C.).

In Table 1, in the comparative examples in which "not performed" is disclosed in a column of the cooling zone staying time of the magnetic layer forming step and a column of the burnishing treatment before the curing process and "performed" is disclosed in a column of the burnishing treatment after the curing process, a magnetic tape was manufactured by a manufacturing step not including the cooling zone in the magnetic layer forming step and performing the burnishing treatment and the wiping treatment by the same method as that in Example 1, not before the curing process, but after the curing process.

In Examples 2 to 14 and Comparative Examples 1 to 9, various evaluations were performed by the same method as in Example 1.

The results described above are shown in Table 1.

TABLE 1

| | Comparative Example 1 | Example 1 | Example 2 | Example 3 | Comparative Example 2 | Example 4 | Example 5 | Comparative Example 3 | Example 6 | Example 7 | Example 8 |
|---|---|---|---|---|---|---|---|---|---|---|---|
| Ferromagnetic powder $\Delta SFD_{powder}$ | 0.32 | 0.32 | 0.32 | 0.32 | 0.32 | 0.32 | 0.32 | 0.30 | 0.30 | 0.30 | 0.30 |
| Ferromagnetic powder average particle size (nm) | 25 | 25 | 25 | 25 | 25 | 25 | 25 | 27 | 27 | 27 | 27 |
| Dispersion particle diameter (nm) | 35 | 35 | 35 | 35 | 35 | 35 | 35 | 50 | 50 | 50 | 50 |
| Beads dispersion time (time) | 40 | 40 | 40 | 40 | 40 | 40 | 40 | 35 | 35 | 35 | 35 |
| Orientation | None | None | None | None | None | None | None | None | None | None | None |
| Magnetic tape $\Delta SFD$ | 0.35 | 0.35 | 0.35 | 0.35 | 0.35 | 0.35 | 0.35 | 0.82 | 0.82 | 0.82 | 0.82 |
| Colloidal silica average particle size (nm) | 80 | 80 | 80 | 80 | 120 | 40 | 40 | 80 | 80 | 80 | 80 |
| Calender temperature (° C.) | 110 | 110 | 110 | 110 | 110 | 90 | 90 | 110 | 110 | 110 | 110 |
| Cooling zone staying time | Not performed | 1 second | 60 seconds | 180 seconds | Not performed | 60 seconds | 180 seconds | Not performed | 1 second | 60 seconds | 180 seconds |
| Burnishing treatment before curing process | Not performed | Performed | Performed | Performed | Not performed | Performed | Performed | Not performed | Performed | Performed | Performed |
| Burnishing treatment after curing process | Performed | Not performed | Not performed | Not performed | Performed | Not performed | Not performed | Performed | Not performed | Not performed | Not performed |
| Magnetic layer surface roughness Ra | 1.7 | 1.7 | 1.7 | 1.7 | 2.2 | 1.4 | 1.2 | 1.7 | 1.7 | 1.7 | 1.7 |
| Logarithmic decrement | 0.062 | 0.048 | 0.030 | 0.015 | 0.060 | 0.029 | 0.016 | 0.061 | 0.049 | 0.030 | 0.017 |
| Signal attenuation (%/decade) | Equal to or smaller than −0.5 | Equal to or smaller than −0.5 | Equal to or smaller than −0.5 | Equal to or smaller than −0.5 | Equal to or smaller than −0.5 | Equal to or smaller than −0.5 | Equal to or smaller than −0.5 | Equal to or smaller than −0.5 | Equal to or smaller than −0.5 | Equal to or smaller than −0.5 | Equal to or smaller than −0.5 |
| Decrease in reproduction output (dB) | −4.0 | −0.8 | −0.6 | −0.5 | −0.8 | −0.6 | −0.5 | −2.9 | −0.6 | −0.5 | −0.4 |

TABLE 1-continued

| | Comparative Example 4 | Example 9 | Example 10 | Example 11 | Comparative Example 5 | Comparative Example 6 | Comparative Example 7 | Comparative Example 8 | Comparative Example 9 | Example 12 | Example 13 | Example 14 |
|---|---|---|---|---|---|---|---|---|---|---|---|---|
| Ferromagnetic powder ΔSFD$_{powder}$ | 0.30 | 0.30 | 0.30 | 0.30 | 0.30 | 0.30 | 0.30 | 0.30 | 1.20 | 1.20 | 1.20 | 1.20 |
| Ferromagnetic powder average particle size (nm) | 27 | 27 | 27 | 27 | 27 | 27 | 27 | 27 | 30 | 30 | 30 | 30 |
| Dispersion particle diameter (nm) | 50 | 50 | 50 | 50 | 20 | 20 | 20 | 20 | 50 | 50 | 50 | 50 |
| Beads dispersion time (time) | 35 | 35 | 35 | 35 | 48 | 48 | 48 | 48 | 35 | 35 | 35 | 35 |
| Orientation | Homeotropic | Homeotropic | Homeotropic | Homeotropic | None | None | None | None | None | None | None | None |
| Magnetic tape ΔSFD | 1.43 | 1.43 | 1.43 | 1.43 | 0.24 | 0.24 | 0.24 | 0.24 | 1.80 | 1.80 | 1.80 | 1.80 |
| Colloidal silica average particle size (nm) | 80 | 80 | 80 | 80 | 80 | 80 | 80 | 80 | 80 | 80 | 80 | 80 |
| Calender temperature (° C.) | 110 | 110 | 110 | 110 | 110 | 110 | 110 | 110 | 110 | 110 | 110 | 110 |
| Cooling zone staying time | Not performed | 1 second | 60 seconds | 180 seconds | Not performed | 1 second | 60 seconds | 180 seconds | Not performed | 1 second | 60 seconds | 180 seconds |
| Burnishing treatment before curing process | Not performed | Performed | Performed | Performed | Not performed | Performed | Performed | Performed | Not performed | Performed | Performed | Performed |
| Burnishing treatment after curing process | Performed | Not performed | Not performed | Not performed | Performed | Not performed | Not performed | Not performed | Performed | Not performed | Not performed | Not performed |
| Magnetic layer surface roughness Ra | 1.7 | 1.7 | 1.7 | 1.7 | 1.7 | 1.7 | 1.7 | 1.7 | 1.7 | 1.7 | 1.7 | 1.7 |
| Logarithmic decrement | 0.062 | 0.049 | 0.032 | 0.015 | 0.061 | 0.046 | 0.029 | 0.015 | 0.060 | 0.048 | 0.031 | 0.017 |
| Signal attenuation (%/decade) | −0.7 | −0.7 | −0.7 | −0.7 | Equal to or smaller than −0.5 | Equal to or smaller than −0.5 | Equal to or smaller than −0.5 | Equal to or smaller than −0.5 | −1.3 | −1.3 | −1.3 | −1.3 |
| Decrease in reproduction output (dB) | −2.5 | −0.5 | −0.4 | −0.2 | −3.9 | −2.9 | −2.4 | −2.1 | −2.2 | −0.4 | −0.2 | −0.2 |

From the comparison of Comparative Example 2 and Comparative Examples 1, 3 to 9 shown in Table 1, it is possible to confirm that a decrease in reproduction output during the repeated high-speed running in the environment of a high temperature and low humidity significantly occurs in the magnetic tape including the magnetic layer having high surface smoothness in which the Ra is equal to or smaller than 1.8 nm.

On the other hand, from the results shown in Table 1, it is possible to confirm that, in the magnetic tapes of Examples 1 to 14, the magnetic layer surface roughness Ra is equal to or smaller than 1.8 nm and a decrease in reproduction output during the repeated high-speed running in the environment of a high temperature and low humidity is prevented.

In a case where the examples are compared to each other, retainability of recording was excellent in Examples 1 to 11 in which the ΔSFD is equal to or smaller than 1.50 (0.35 to 1.50), compared to Examples 12 to 14. From a viewpoint of retainability of recording, the signal attenuation measured by the method is preferably equal to or smaller than −0.7%/decade.

The invention is effective in technical fields of magnetic tapes used as recording media for data storage.

What is claimed is:

1. A magnetic tape comprising:
a non-magnetic support; and
a magnetic layer including ferromagnetic powder and a binding agent on the non-magnetic support,
wherein the center line average surface roughness Ra measured regarding the surface of the magnetic layer is equal to or smaller than 1.8 nm,
the logarithmic decrement acquired by a pendulum viscoelasticity test performed regarding the surface of the magnetic layer is 0.010 to 0.050,
ΔSFD in a longitudinal direction of the magnetic tape calculated by Expression 1 is equal to or greater than 0.35, $$\Delta SFD = SFD_{25°\ C.} - SFD_{-190°\ C.}$$  Expression 1 in Expression 1, the $SFD_{25°\ C.}$ is the switching field distribution SFD measured in a longitudinal direction of the magnetic tape at a temperature of 25° C., and the $SFD_{-190°\ C.}$ is the switching field distribution SFD measured in a longitudinal direction of the magnetic tape at a temperature of −190° C., and the logarithmic decrement on the magnetic layer side is determined by the following method:
securing a measurement sample of the magnetic tape with the measurement surface, which is the surface on the magnetic layer side, facing upward on a substrate in a pendulum viscoelasticity tester;
disposing a columnar cylinder edge which is 4 mm in diameter and equipped with a pendulum 13 g in weight on the measurement surface of the measurement sample such that the long axis direction of the columnar cylinder edge runs parallel to the longitudinal direction of the measurement sample;
raising the surface temperature of the substrate on which the measurement sample has been positioned at a rate of less than or equal to 5° C./min up to 80° C.;
inducing initial oscillation of the pendulum;
monitoring the displacement of the pendulum while it is oscillating to obtain a displacement-time curve for a measurement interval of greater than or equal to 10 minutes; and
obtaining the logarithmic decrement Δ from the following equation:

$$\Delta = \frac{\ln\left(\frac{A_1}{A_2}\right) + \ln\left(\frac{A_2}{A_3}\right) + \cdots \ln\left(\frac{A_n}{A_{n+1}}\right)}{n}$$

wherein the interval from one minimum displacement to the next minimum displacement is adopted as one wave period; the number of waves contained in the displacement-time curve during one measurement interval is denoted by n, the difference between the minimum displacement and the maximum displacement of the $n^{th}$ wave is denoted by An, and the logarithmic decrement is calculated using the difference between the next minimum displacement and maximum displacement of the $n^{th}$ wave ($A_{n+1}$ in the above equation).

2. The magnetic tape according to claim 1, wherein the center line average surface roughness Ra is 1.2 nm to 1.8 nm.

3. The magnetic tape according to claim 1, wherein the ΔSFD is 0.35 to 1.50.

4. The magnetic tape according to claim 2, wherein the ΔSFD is 0.35 to 1.50.

5. The magnetic tape according to claim 1, further comprising:
a non-magnetic layer including non-magnetic powder and a binding agent between the non-magnetic support and the magnetic layer.

6. The magnetic tape according to claim 1, further comprising:
a back coating layer including non-magnetic powder and a binding agent on a surface side of the non-magnetic support opposite to a surface side provided with the magnetic layer.

* * * * *